United States Patent
Lee et al.

(10) Patent No.: US 10,071,741 B2
(45) Date of Patent: Sep. 11, 2018

(54) DRIVER ASSISTANCE APPARATUS FOR VEHICLE AND VEHICLE HAVING THE SAME

(71) Applicant: LG ELECTRONICS INC., Seoul (KR)

(72) Inventors: Jeihun Lee, Seoul (KR); Hansung Lee, Seoul (KR); Soohwan Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 25 days.

(21) Appl. No.: 15/254,299

(22) Filed: Sep. 1, 2016

(65) Prior Publication Data

US 2017/0066449 A1    Mar. 9, 2017

(30) Foreign Application Priority Data

Sep. 3, 2015  (KR) .................. 10-2015-0125006

(51) Int. Cl.
*B60W 40/04* (2006.01)
*B60W 10/184* (2012.01)
(Continued)

(52) U.S. Cl.
CPC ........... *B60W 40/04* (2013.01); *B60G 17/019* (2013.01); *B60G 17/02* (2013.01); *B60W 10/184* (2013.01);
(Continued)

(58) Field of Classification Search
CPC .................. B60G 17/019; B60G 17/02; B60G 2401/142; B60G 2500/30;
(Continued)

(56) References Cited

U.S. PATENT DOCUMENTS 6,275,231 B1 * 8/2001 Obradovich ........ B60R 16/0231
345/156
2005/0080530 A1    4/2005 Arduc et al.
(Continued)

FOREIGN PATENT DOCUMENTS

CN          1315675 U        5/2007
DE       102006020387       10/2007
(Continued)

OTHER PUBLICATIONS

Extended European Search Report in European Application No. 16186828.6, dated Jan. 31, 2017, 10 pages (with English translation).

(Continued)

*Primary Examiner* — Mussa A Shaawat
(74) *Attorney, Agent, or Firm* — Fish & Richardson P.C.

(57) ABSTRACT

A driver assistance apparatus includes an object detection sensor configured to acquire data in a driving direction of a vehicle or around the vehicle. The driver assistance apparatus also includes a processor that is configured to detect an object based on the acquired data and determine, based on the acquired data, a portion of the detected object that is expected to be impacted by the vehicle. The processor is also configured to provide, based on the determined portion of the detected object that is expected to be impacted by the vehicle, a height control signal that controls a suspension of the vehicle to adjust a height of at least a portion of the vehicle.

20 Claims, 27 Drawing Sheets

(51) Int. Cl.
*B60W 10/22* (2006.01)
*B60G 17/019* (2006.01)
*B60G 17/02* (2006.01)

(52) U.S. Cl.
CPC ....... *B60W 10/22* (2013.01); *B60G 2401/142* (2013.01); *B60G 2500/30* (2013.01); *B60G 2800/222* (2013.01); *B60W 2550/10* (2013.01); *B60W 2710/18* (2013.01); *B60W 2710/22* (2013.01)

(58) Field of Classification Search
CPC .......... B60G 2800/222; B60W 10/184; B60W 10/22; B60W 40/04; B60W 2550/10; B60W 2710/18; B60W 2710/22
See application file for complete search history.

(56) References Cited

U.S. PATENT DOCUMENTS

| | | | | |
|---|---|---|---|---|
| 2006/0213714 A1* | 9/2006 | Igawa | ................ | B60R 21/0134 180/274 |
| 2008/0119984 A1* | 5/2008 | Hrovat | ............... | B60G 17/0162 701/38 |
| 2013/0184940 A1* | 7/2013 | Stoll | ....................... | B60R 21/01 701/45 |
| 2014/0195113 A1* | 7/2014 | Lu | ...................... | B60G 17/0165 701/37 |
| 2015/0202939 A1* | 7/2015 | Stettner | ............... | B60R 21/0134 701/37 |

FOREIGN PATENT DOCUMENTS

| | | |
|---|---|---|
| DE | 102009009472 | 8/2010 |
| EP | 2775316 | 9/2014 |
| JP | 2000105898 | 4/2000 |
| JP | 2000177514 | 6/2000 |
| JP | 2004017812 | 1/2004 |
| JP | 2007296941 | 11/2007 |
| JP | 2007308110 | 11/2007 |
| JP | 2010241277 | 10/2010 |
| JP | 2015009621 | 1/2015 |
| JP | 2015067215 | 4/2015 |
| JP | 2015120398 | 7/2015 |
| KR | 10-1998-0020459 | 6/1998 |
| KR | 2003-0085076 | 11/2003 |
| KR | 10-2014-0106853 | 9/2014 |
| KR | 10-2015-0074753 | 7/2015 |

OTHER PUBLICATIONS

Chinese Office Action in Chinese Application No. 201610709487.X, dated May 17, 2018, 17 pages.

* cited by examiner

DRIVER ASSISTANCE APPARATUS FOR VEHICLE AND VEHICLE HAVING THE SAME

CROSS-REFERENCE TO RELATED APPLICATIONS

This application claims an earlier filing date and right of priority to Korean Patent Application No. 10-2015-0125006, filed on Sep. 3, 2015 in the Korean Intellectual Property Office, the contents of which is incorporated herein by reference in its entirety.

TECHNICAL FIELD

The present disclosure relates to a driver assistance apparatus for a vehicle.

BACKGROUND

A vehicle is an apparatus that is motorized to move in a desired direction by control of a user riding therein. A typical example of the vehicle is an automobile.

Vehicles have been increasingly equipped with various sensors and electronic devices to provide user convenience. In particular, various apparatuses for driver convenience are under development.

Recently, as attention is increasingly drawn to autonomous vehicles, research on sensors to be installed in the autonomous vehicles is underway. Sensors installed in autonomous vehicles include object detection sensors such as a camera, an infrared sensor, a radar, a global positioning system (GPS), a lidar and a gyroscope. Thereamong, the camera plays an important role as a sensor operating like the eyes of a person. If the vehicle collides with a pedestrian in an accident, the accident is very likely to result in considerable loss of life. Conventionally, technologies for preventing collision with pedestrians have been widely researched and developed. These technologies have recently been widely applied even to vehicles in mass production.

However, even a vehicle adopting a collision prevention technology is difficult to avoid collision according to a sudden movement of a pedestrian. In this regard, technologies such as a hood pop-up apparatus and a pedestrian protection airbag (e.g., Korean Patent Application Publication No. 2003-0085076) for protecting pedestrians when collision occurs have been developed.

In addition to these technologies, if research and development of a technology for controlling a suspension to adjust an expected impacted portion of the pedestrian are conducted, pedestrians may be more efficiently protected when collision occurs.

SUMMARY

Systems and techniques are disclosed herein that enable automated control of a suspension of a vehicle in response to detecting an expected collision with an object.

In one aspect, a driver assistance apparatus may include an object detection sensor configured to acquire data in a driving direction of a vehicle or around the vehicle. The driver assistance apparatus may also include a processor configured to detect an object based on the acquired data; determine, based on the acquired data, a portion of the detected object that is expected to be impacted by the vehicle; and provide, based on the determined portion of the detected object that is expected to be impacted by the vehicle, a height control signal that controls a suspension of the vehicle to adjust a height of at least a portion of the vehicle.

In some implementations, the processor may be configured to detect, based on the acquired data, that the object is a pedestrian; determine that the pedestrian is expected to be impacted by the vehicle in a primary collision; determine that, in a secondary collision after the primary collision, the head of the pedestrian is expected to be impacted by the hood of the vehicle; and provide, based on the determination that the head of the pedestrian is expected to be impacted by the hood of the vehicle in the secondary collision, the height control signal that controls the suspension such that a first area of the hood of the vehicle is positioned to impact the head of the pedestrian in the secondary collision.

In some implementations, the processor may be configured to detect that the vehicle performs a braking operation related to the primary collision in which the pedestrian is expected to be impacted by the vehicle; and provide the height control signal to control a front wheel suspension of the vehicle.

In some implementations, the processor may be configured to provide the height control signal that controls the suspension such that the first area of the hood of the vehicle is positioned to impact the head of the pedestrian in the secondary collision by: determining a portion of the hood through which a pedestrian airbag is configured to inflate; and setting the first area of the hood to be the portion of the hood through which the pedestrian airbag is configured to inflate.

In some implementations, the processor is further configured to detect, based on the data acquired in the driving direction of the vehicle or around the vehicle, a height of the pedestrian; and provide the height control signal to control the suspension of the vehicle based on the detected height of the pedestrian.

In some implementations, the processor is further configured to determine that the detected height of the pedestrian is greater than or equal to a first reference value; and provide, based on the determination that the detected height of the pedestrian is greater than or equal to a first reference value, the height control signal to control a front wheel suspension of the vehicle.

In some implementations, the processor is further configured to provide, based on the determination that the detected height of the pedestrian is greater than or equal to the first reference value, the height control signal to control the front wheel suspension of the vehicle by providing the height control signal to control the front wheel suspension of the vehicle such that a portion of a front bumper of the vehicle is expected to make an initial contact with the pedestrian at a portion of the pedestrian corresponding to a location of at least one knee of the pedestrian.

In some implementations, the processor is configured to provide the height control signal to control the suspension of the vehicle based on the detected height of the pedestrian by determining that the height of the pedestrian is less than or equal to a second reference value; and providing the height control signal to lower a front wheel suspension of the vehicle.

In some implementations, the processor is configured to determine that the detected object is expected to be impacted by the vehicle in a primary collision and in a secondary collision after the primary collision; and provide, based on the determination that that the detected object is expected to be impacted by the vehicle in the primary collision and in the secondary collision after the primary collision, the height control signal that controls the suspension of the vehicle such that the suspension of the vehicle absorbs a shock of the secondary collision with the object.

In some implementations, the processor is configured to provide the height control signal that controls the suspension of the vehicle such that the suspension of the vehicle absorbs the shock of the secondary collision with the object by: providing the height control signal such that a front wheel suspension of the vehicle is lowered during the secondary collision with the object.

In some implementations, providing the height control signal such that the front wheel suspension of the vehicle is lowered during the secondary collision with the object includes: determining a lift direction of the detected object after the primary collision with the object; and providing the height control signal based on the determined lift direction of the detected object after the primary collision with the object such that a height of a left wheel suspension of the vehicle differs from a height of a right wheel suspension of the vehicle.

In some implementations, providing the height control signal such that the front wheel suspension of the vehicle is lowered during the secondary collision with the object includes: determining a lift direction of the detected object after the primary collision with the object; and providing the height control signal based on the determined lift direction of the detected object after the primary collision with the object such that a height of the front wheel suspension of the vehicle differs from a height of a rear wheel suspension of the vehicle.

In some implementations, the processor is configured to provide the height control signal that controls the suspension of the vehicle such that the suspension of the vehicle absorbs a shock of the secondary collision with the object by: providing the height control signal that controls the suspension of the vehicle such that a hood of the vehicle lifts up prior to the secondary collision and after the primary collision with the object.

In some implementations, the processor is configured to provide the height control signal that controls the suspension of the vehicle such that the suspension of the vehicle absorbs a shock of the secondary collision with the object by: determining a lift direction of the detected object after the primary collision with the object; and providing, based on the determined lift direction of the detected object after the primary collision with the object, the height control signal to control a lift-up operation of a hood of the vehicle by operation of a first actuator disposed on a left side of the vehicle and a second actuator disposed on a right side of the vehicle such that a degree of operation of the first actuator differs from a degree of operation of the second actuator.

In some implementations, the processor is further configured to: detect, based on the data acquired in the driving direction of the vehicle, a curve in a road ahead of the vehicle; and provide, based on detection of the curve in the road ahead of the vehicle, the height control signal to control a left wheel suspension of the vehicle or a right wheel suspension of the vehicle.

In some implementations, the driver assistance apparatus further includes an interface unit configured to receive, through a sensing unit, travel speed information of the vehicle. The processor may further be configured to: detect a degree of curvature of a curve in a road ahead of the vehicle and a speed of the vehicle entering the curve in the road; and provide the height control signal to control a height of a left wheel suspension of the vehicle or a right wheel suspension of the vehicle based on the detected degree of curvature of the curve in the road ahead of the vehicle and the detected speed of the vehicle entering the curve in the road.

In some implementations, the driver assistance apparatus further includes: an interface unit configured to communicate with a power source drive unit that provides driving power to the vehicle. The processor may further be configured to: detect a front collision or a rear-end collision with the detected object; and provide a control signal to the power source drive unit to disable driving power to the vehicle.

In some implementations, the processor is configured to: detect, based on the data acquired in the driving direction of the vehicle, road surface condition information for a road ahead of the vehicle; and provide the height control signal based on the detected road surface condition information.

In some implementations, the processor is configured to: determine that a trunk of the vehicle has opened; and provide, based on the determination that the trunk of the vehicle has opened, the height control signal to lower a rear wheel suspension of the vehicle.

In another aspect, a suspension apparatus for a vehicle includes: an interface unit configured to receive, from a driver assistance apparatus, a height control signal that controls a suspension of the vehicle to adjust a height of at least a portion of the vehicle based on a portion of an object detected in a driving direction of the vehicle or around the vehicle that is expected to be impacted by the vehicle. The suspension apparatus also includes a processor configured to control a height of the suspension according to the received height control signal.

In another aspect, a vehicle includes a driver assistance apparatus including: an object detection sensor configured to acquire data in a driving direction of the vehicle or around the vehicle; and a first processor configured to: detect an object based on the acquired data; determine, based on the acquired data, a portion of the detected object that is expected to be impacted by the vehicle; provide, based on the determined portion of the detected object that is expected to be impacted by the vehicle, a height control signal that controls a suspension of the vehicle to adjust a height of at least a portion of the vehicle; and a suspension apparatus including: an interface unit configured to receive the height control signal; and a second processor configured to control a height of the suspension of the vehicle according to the received height control signal.

All or part of the features described throughout this application can be implemented as a computer program product including instructions that are stored on one or more non-transitory machine-readable storage media, and that are executable on one or more processing devices. All or part of the features described throughout this application can be implemented as an apparatus, method, or electronic system that can include one or more processing devices and memory to store executable instructions to implement the stated functions.

The details of one or more implementations are set forth in the accompanying drawings and the description below. Other features will be apparent from the description and drawings, and from the claims. The description and specific examples below are given by way of illustration only, and various changes and modifications will be apparent.

DETAILED DESCRIPTION

The present disclosure describes a driver assistance apparatus that is configured to control a height of a suspension of a vehicle based on detecting an expected collision with an object. In some implementations, the driver assistance apparatus detects a portion of an object that is expected to be impacted by the vehicle and controls the suspension such that a height of at least one portion of the vehicle is adjusted to mitigate damage to the object.

If a vehicle collides with a pedestrian in an accident, the accident is likely to result in considerable injury or loss of life to the pedestrian. Even if a vehicle is equipped with collision-prevention technology, unexpected movements of a pedestrian and/or poor environmental conditions may nonetheless result in a collision.

The present disclosure describes systems and techniques that enable automated control of a suspension of a vehicle to adjust the height of at least a portion of the vehicle based on detecting that an impact with an object is expected to occur. Such systems and techniques may help better protect pedestrians and objects when a collision with a vehicle occurs.

The term "vehicle" employed in this application may include an automobile, a motorcycle, or other suitable type of vehicle that transports people. Hereinafter, description will be given mainly focusing on an automobile.

The vehicle described in this application may include a vehicle equipped with an internal combustion engine as a power source, a hybrid vehicle equipped with both an engine and an electric motor as a power source, an electric vehicle equipped with an electric motor as a power source, or generally a vehicle that is motorized by any suitable power source.

In the description below, the left side of the vehicle refers to the left side with respect to a travel direction of the vehicle and the right side of the vehicle refers to the right side with respect to the travel direction of the vehicle.

A left-hand drive (LHD) vehicle refers to a vehicle in which a driver's seat is located at the left side of the vehicle. A right-hand drive (RHD) vehicle refers to a vehicle in which a driver's seat is located at the right side of the vehicle. LHD vehicles are used in countries where vehicles travel on a right side of two-way traffic, and RHD vehicles are used in countries where vehicles travel on a left side of two-way traffic.

If not stated otherwise, description will be given focusing on a left hand drive (LHD) vehicle, but implementations are not limited therefore and may also apply to an RHD vehicle.

Figure 1:
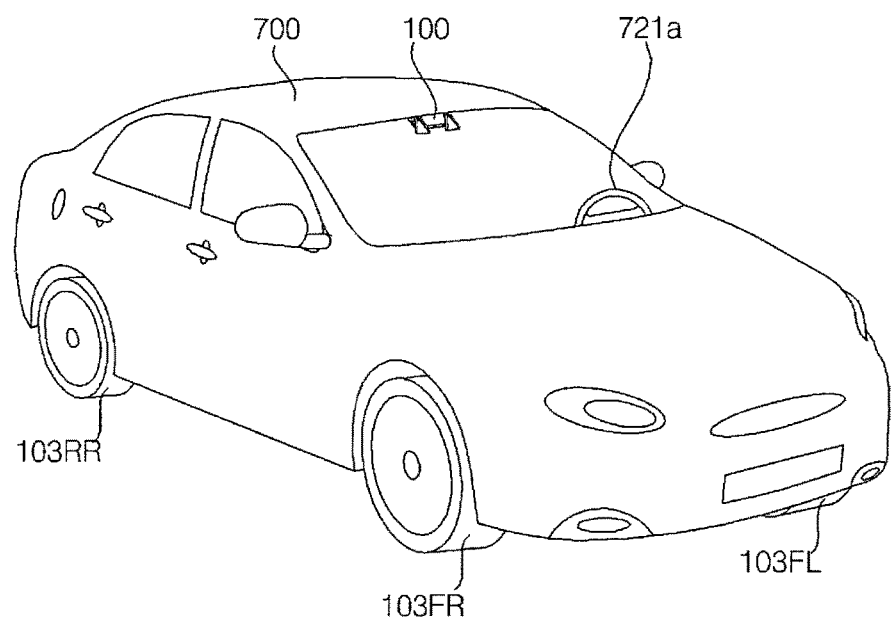
FIG. 1 illustrates an example of an exterior of a vehicle according to some implementations.
Figure 1:
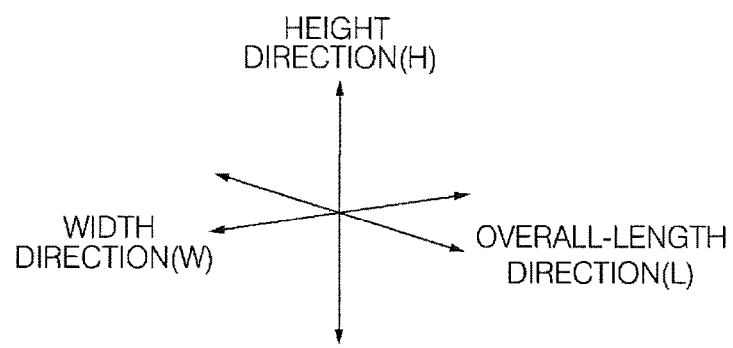

FIG. 1 shows the exterior of a vehicle according to an implementation of the present invention.

Referring to FIG. 1, a vehicle 700 may include wheels 103FR, 103FL, 103RL, . . . rotated by a power source, a steering input means 721a for adjusting the travel direction of the vehicle 700, and a driver assistance system 100 provided in the vehicle 700.

The driver assistance apparatus 100 may be provided with at least one object detection sensor, such as a camera, and images acquired by the at least one camera may be signal-processed in a processor.

In the illustrated example, the driver assistance apparatus 100 is provided with two cameras.

The overall length refers to the length of the vehicle 700 from the front to back of the vehicle, the width refers to the width of the vehicle 700, and the height refers to the distance from the bottom of a wheel to the roof of the vehicle. In the description below, the overall-length direction L may indicate a direction in which measurement of overall length of the vehicle 700 is performed, the width direction W may indicate a direction in which measurement of width of the vehicle 700 is performed, and the height direction H may indicate a direction in which measurement of height of the vehicle 700 is performed.

In the present invention, the vehicle 700 may cover an autonomous vehicle.

In the description below, the vehicle 700 will be referred to as a driver's vehicle 700 in order to distinguish the vehicle 700 from other vehicles.

Figure 2A:
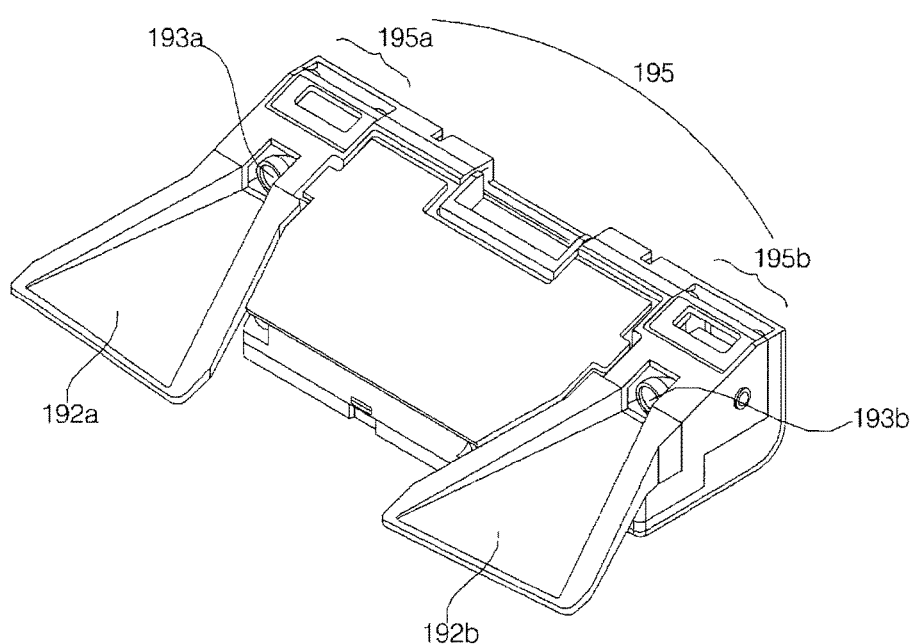
FIGS. 2A to 2C illustrate a driver assistance apparatus (e.g., such as that included in the vehicle of FIG. 1) according to some implementations.
Figure 2B:
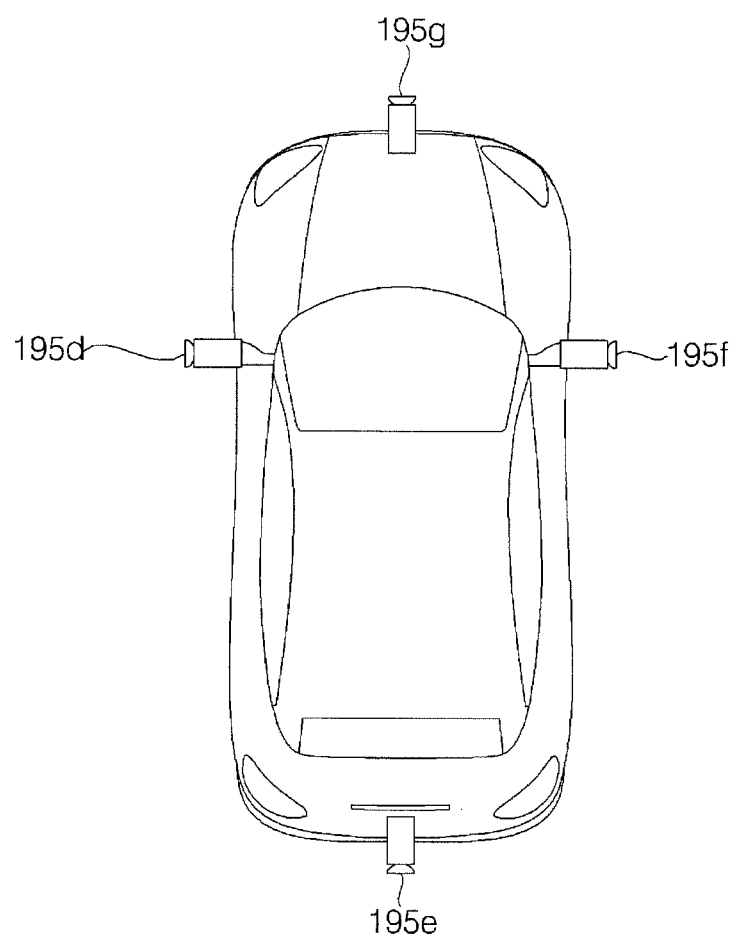
Figure 2C:
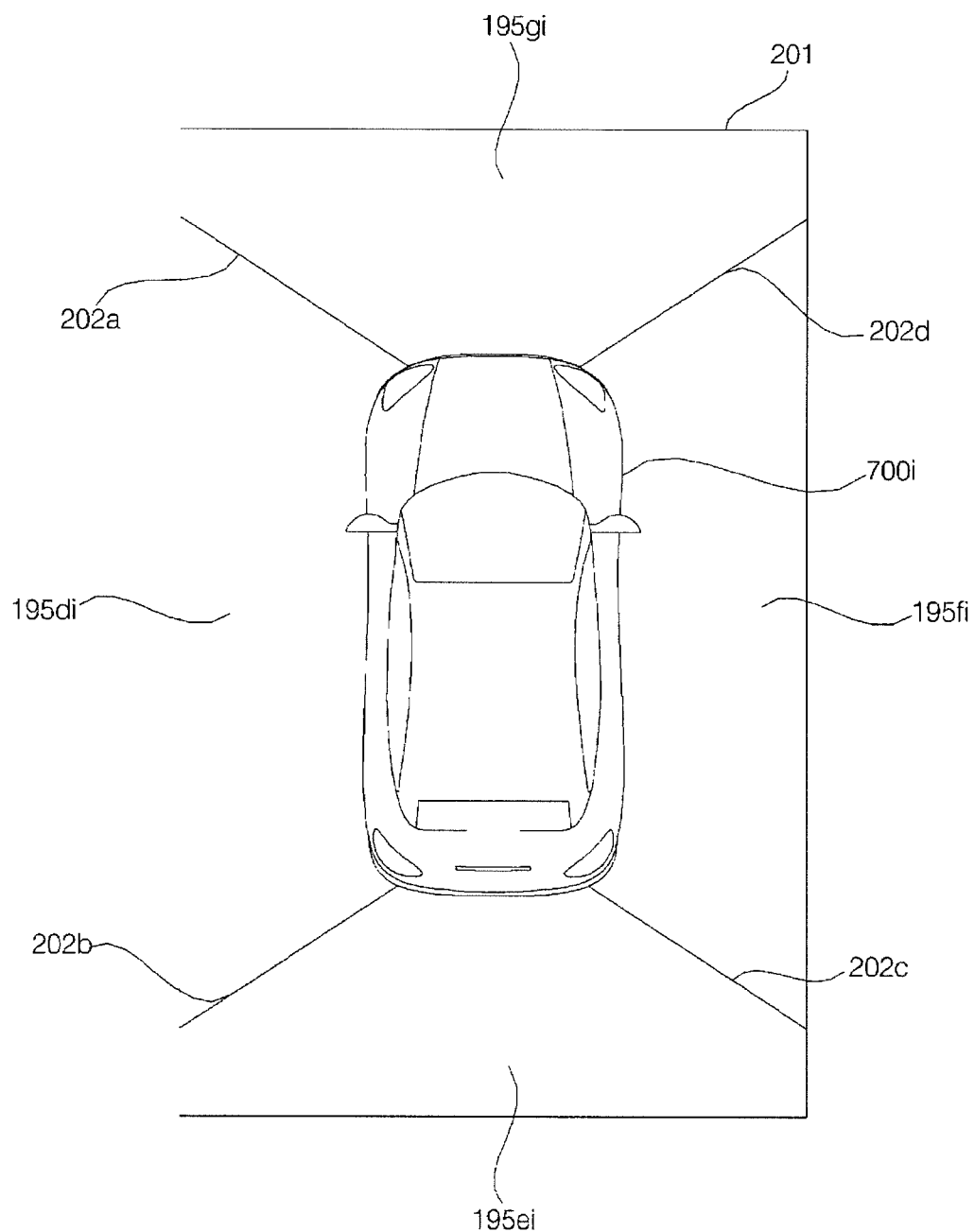

FIGS. 2A to 2C illustrate a driver assistance apparatus included in the vehicle of FIG. 1 according to some implementations.

Hereinafter, description will be given of a driver assistance apparatus including cameras 195a and 195b for acquiring images of the front view of the vehicle with reference to FIG. 2a.

While the driver assistance apparatus 100 is illustrated as including two cameras in FIG. 2A, it is apparent that the number of cameras is not limited thereto.

Referring to FIG. 2A, the driver assistance apparatus 100 may include a first camera 195a provided with a first lens 193a and a second camera 195b provided with a second lens 193b. In this case, the camera 195 may be called a stereo camera.

The driver assistance apparatus 100 may include a first light shield 192a and a second light shield 192b, which are intended to block light incident on the first lens 193a and the second lens 193b, respectively.

The driver assistance apparatus 100 shown in the figure may be detachably attached to the ceiling or windshield of the vehicle 700.

The driver assistance apparatus 100 may acquire stereo images of the front view of the vehicle from the first and second cameras 195a and 195b, perform disparity detection based on the stereo images, perform object detection in at least one stereo image based on the disparity information, and continuously track movement of an object after object detection.

Hereinafter, description will be given of a driver assistance apparatus including cameras 195d, 195e, 195f and 195g for acquiring images of surroundings of the vehicle with reference to FIGS. 2B and 2C.

While FIGS. 2B and 2C illustrate the driver assistance apparatus 100 as including four cameras, it is apparent that the number of cameras is not limited thereto.

Referring to FIGS. 2A and 2B, the driver assistance apparatus 100 may include a plurality of cameras 195d, 195e, 195f and 195g. In this case, the camera 195 may be called an around view camera.

The cameras 195d, 195e, 195f and 195g may be disposed at the left, back, right and front of the vehicle, respectively.

The left camera 195d may be disposed in a case surrounding the left side-view mirror. Alternatively, the left camera 195d may be disposed at the exterior of the case surrounding the left side-view mirror. Alternatively, the left camera 195d may be disposed in one outer area of the left front door, left rear door or left fender.

The right camera 195f may be disposed in a case surrounding the right side-view mirror. Alternatively, the right camera 195f may be disposed at the exterior of the case surrounding the right side-view mirror. Alternatively, the right camera 195f may be disposed at one outer area of the right front door, right rear door or right fender.

The rear camera 195e may be disposed near the rear license plate or trunk switch.

The front camera 195g may be disposed near the emblem or radiator grille.

Images captured by the plurality of cameras 195d, 195e, 195f and 195g may be delivered to the processor 170, and the processor 170 may synthesize the images to generate an image of the surroundings of the vehicle.

FIG. 2C shows an exemplary image of the surroundings of the vehicle. A surroundings-of-vehicle image 201 may include a first image area 195di of an image captured by the left camera 195d, a second image area 195ei of an image captured by the rear camera 195e, the third image area 195fi of an image captured by the right camera 195f, and the fourth image area 195gi of an image captured by the front camera 195g.

The surroundings-of-vehicle image 201 may be displayed as a top view image or bird's eye view image.

When an around view image is generated from the plurality of cameras, boundary parts may be produced among the respective image areas. The boundary parts may be processed through image blending to look natural when they are displayed.

In some implementations, boundary lines 202a, 202b, 202c, and 202d may be displayed on the respective boundaries of a plurality of images.

The surroundings-of-vehicle image 201 may include a vehicle image 700i. Herein, the vehicle image 700i may be generated by the processor 170.

The surroundings-of-vehicle image 201 may be displayed through the display unit 741 of the vehicle or a display unit 180 of the driver assistance apparatus.

Figure 3A:
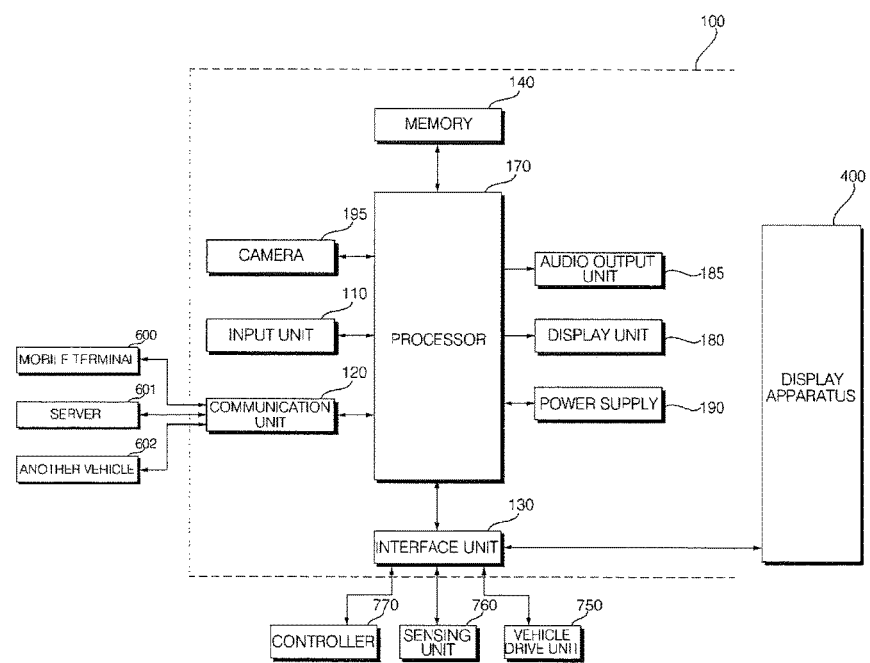
FIGS. 3A to 3C are internal block diagrams illustrating examples of a driver assistance apparatus according to various implementations.
Figure 3B:
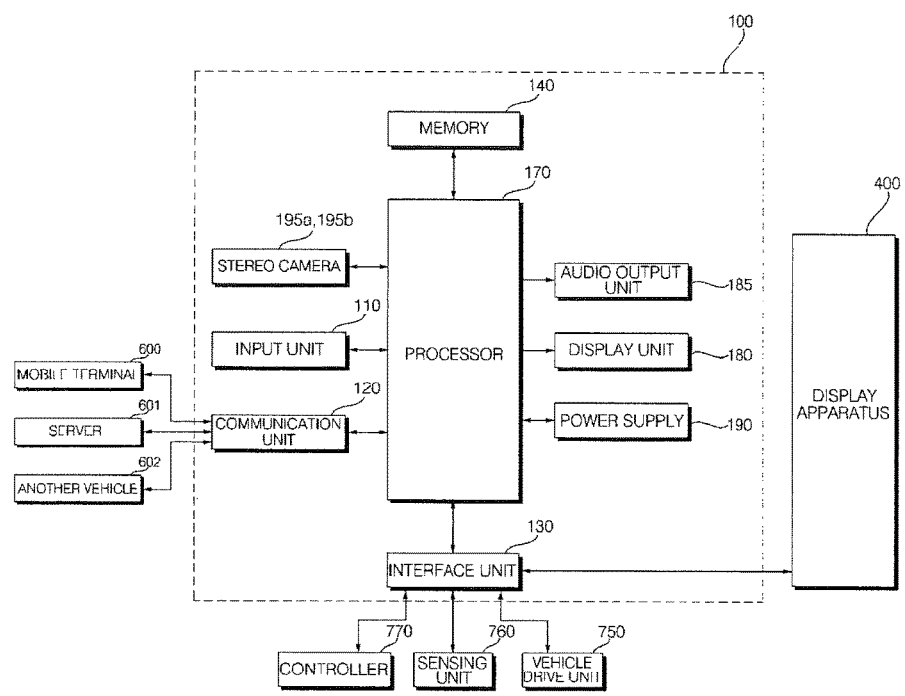
Figure 3C:
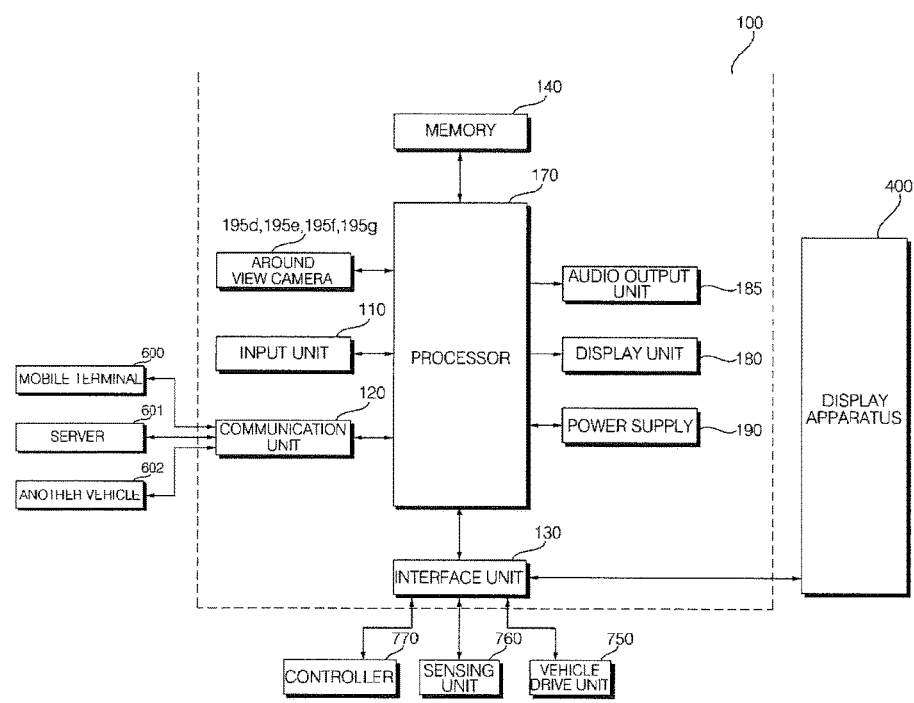

FIGS. 3A to 3C are exemplary internal bock diagrams of a driver assistance apparatus according to various implementations.

The driver assistance apparatus 100 of FIGS. 3A and 3B may generate vehicle-related information by signal-processing an image received from the camera 195 based on computer vision. Herein, the vehicle-related information may include vehicle control information for direct control of the vehicle or vehicle driving assistance information for assisting the driver in driving the vehicle.

Herein, the camera 195 may be a mono camera. Alternatively, the camera 195 may include around view cameras 195d, 195e, 195f and 195g for capturing images of surroundings of the vehicle.

FIG. 3A is an internal block diagram of the driver assistance apparatus 100 according to an implementation.

Referring to FIG. 3A, the driver assistance apparatus 100 may include an input unit 110, a communication unit 120, an interface unit 130, a memory 140, a processor 170, a power supply 190, a camera 195, a display unit 180 and an audio output unit 185.

The input unit 110 may be equipped with a plurality of buttons or a touchscreen attached to the driver assistance apparatus 100, in particular, the camera 195. The driver assistance apparatus 100 may be turned on and operated through the plurality of buttons or the touchscreen. Various input operations may also be performed through the buttons or touchscreen.

The communication unit 120 may wirelessly exchange data with a mobile terminal 600, a server 601 or another vehicle 602. In particular, the communication unit 120 may wirelessly exchange data with a mobile terminal of the vehicle driver. Applicable wireless data communication schemes may include Bluetooth, Wi-Fi Direct, Wi-Fi, APiX, and NFC.

The communication unit 120 may receive weather information and traffic situation information (e.g., TPEG (Transport Protocol Expert Group)) from the mobile terminal 600 or the server 601. The driver assistance apparatus 100 may transmit recognized real-time information to the mobile terminal 600 or the server 601.

When a user enters the vehicle, the mobile terminal 600 of the user may be paired with the driver assistance apparatus 100 automatically or by execution of an application by the user.

The communication unit 120 may receive change-of-traffic light information from the external server 601. Herein, the external server 601 may be a server positioned at a traffic control center that controls traffic.

The interface unit 130 may receive vehicle-related data or transmit a signal processed or generated by the processor 170. To this end, the interface unit 130 may perform data communication with the controller 770, a display apparatus 400 for vehicles, a sensing unit 760 and a vehicle drive unit 750, which are included in the vehicle, through wired or wireless communication.

The interface unit 130 may receive navigation information through communication with the controller 770, the display apparatus 400 or a separate navigation apparatus. Herein, the navigation information may include destination information, route information according to the destination, map information, or current vehicle location information, wherein the map information and the current vehicle location information are related to traveling of the vehicle.

The interface unit 280 may receive sensor information from the controller 770 or the sensing unit 760.

Herein, the sensor information may include at least one of vehicle direction information, vehicle location information (GPS information), vehicle orientation information, vehicle speed information, vehicle acceleration information, vehicle inclination information, vehicle drive/reverse information, battery information, fuel information, tire information, vehicular lamp information, vehicle interior temperature information, vehicle interior humidity information, and information about whether or not it rains.

Such sensor information may be acquired from a heading sensor, a yaw sensor, a gyro sensor, a position module, a vehicle drive/reverse drive sensor, a wheel sensor, a vehicle speed sensor, a vehicle body tilt sensor, a battery sensor, a fuel sensor, a tire sensor, a steering sensor based on turning of the steering wheel, a vehicle interior temperature sensor, a vehicle interior humidity sensor, and a rain sensor. The position module may include a GPS module for receiving GPS information.

Among the pieces of sensor information, the vehicle direction information, vehicle location information, vehicle orientation information, vehicle speed information and vehicle inclination information, which are related to traveling of the vehicle, may be called vehicle travel information.

The interface unit 130 may provide a signal to the controller 770 or the vehicle drive unit 750. Herein, the signal may be a control signal. For example, the processor 170 may provide a steering control signal to the controller 770 or a steering drive unit 752 via the interface unit 130.

The memory 140 may store various kinds of data for overall operation of the driver assistance apparatus 100 including a program for processing or controlling operation of the processor 170.

The memory 140 may store data for identifying an object. For example, if a predetermined object is detected in an image acquired through the camera 195, the memory 140 may store data for identifying the object according to a predetermined algorithm.

The memory 140 may store traffic information data. For example, if predetermined traffic information is detected in an image acquired through the camera 195, the memory 140 may store data for identifying the traffic information according to a predetermined algorithm.

When implemented through hardware, the memory 140 may include various storage devices such as a ROM, RAM, EPROM, flash drive, and hard drive.

The processor 170 may control overall operation of each unit in the driver assistance apparatus 100.

The processor 170 may process a vehicle front view image or a surroundings-of-vehicle image acquired by the camera 195. In particular, the processor 170 performs signal processing based on computer vision. Thereby, the processor 170 may acquire an image of the front view or surroundings of the vehicle from the camera 195, and may detect and track an object based on the image. In particular, in detecting an object, the processor 170 may perform lane detection (LD), vehicle detection (VD), pedestrian detection (PD), bright spot detection (BD), traffic sign recognition (TSR), and road surface detection.

The processor 170 may detect information in a vehicle front view image or surroundings-of-vehicle image acquired by the camera 195.

The information may be information about the travel situation of the vehicle. For example, the information may include information on the road on which the vehicle travels, traffic law information, nearby vehicle information, vehicle or pedestrian traffic light information, construction information, traffic situation information, parking lot information, and lane information.

The processor 170 may identify the detected information by comparing the detected information with information stored in the memory 140.

In some implementations, the processor 170 may receive weather information and traffic situation information (e.g., TPEG (Transport Protocol Expert Group) information) through the communication unit 120.

The processor 170 may check the traffic situation information about the surroundings of the vehicle that is recognized by the driver assistance apparatus 100 based on images.

The processor 170 may receive, for example, navigation information from the display apparatus 400 or a separate navigation apparatus via the interface unit 130.

In some implementations, the processor 170 may receive sensor information from the controller 770 or the sensing unit 760 through the interface unit 130. Herein, the sensor information may include at least one of vehicle direction information, vehicle location information (GPS information), vehicle orientation information, vehicle speed information, vehicle acceleration information, vehicle inclination information, vehicle drive/reverse information, battery information, fuel information, tire information, vehicular lamp information, interior temperature information, interior humidity information and steering wheel rotation information.

The processor 170 may receive an image acquired by the camera 195. Herein, the image may be a vehicle front view image or surroundings-of-vehicle image. The camera 195 may include a mono camera, stereo cameras 195*a* and 195*b* or around view cameras 195*d*, 195*e*, 195*f* and 195*g*.

The processor 170 may detect an object. The processor 170 may verify and track the detected object. Herein, the object may be a pedestrian. Freezable, the object may be a pedestrian positioned in the front of the vehicle 700.

The processor 170 may predict collision between the driver's vehicle 700 and an object detected in an image.

The processor 170 may calculate a distance to the detected object. For example, the processor 170 may calculate the distance to the object based on variation of the recognized size of the object over time. Alternatively, the processor 170 may calculate the distance to the object based on disparity. Alternatively, the processor 170 may calculate the distance to the object based on Time of Flight (TOF).

The processor 170 may calculate a relative speed of the object based on the detected distance. For example, the processor 170 may calculate the relative speed of the object by calculating the change in distance to the object per unit time.

The processor 170 may detect the speed of the object based on the travel speed of the driver's vehicle 700 and the relative speed.

The processor 170 may predict collision with the object based on the distance and the relative speed of the object. For example, the processor 170 may compute the time to collision (TTC) with the object. If the TTC is less than a reference value, the processor 170 may predict occurrence of collision with the object.

The processor 170 may provide a suspension height control signal for adjusting an expected impacted portion of the object according to the collision.

By providing the suspension height control signal for adjusting the expected impacted portion of the object, the processor 170 may minimize shock applied to the object.

The suspension height control signal may be provided to a suspension drive unit 759. The suspension drive unit 759 may control the suspension apparatus according to the control signal.

According to an implementation, the processor 170 may provide a steering control signal for adjusting an expected impacted portion of the object according to collision.

The processor 170 may provide a leftward or rightward steering control signal for adjusting the expected impacted portion of the object to minimize shock applied to the object.

The steering control signal may be provided to the steering drive unit 752.

In some implementations, when collision with an object is predicted, the processor 170 may provide a suspension height control signal such that shock from the object is applied to the collision sensor for inflation of an airbag. For example, when collision with an object is predicted, the processor 170 may provide a suspension height control signal such that the collision sensor for inflating the airbag collides with the object. In this case, the processor 170 may provide a steering control signal such that the collision sensor for inflating the airbag collides with the object. The steering control signal may be provided to a steering drive unit 752.

The processor 170 may predict collision with a pedestrian. For example, the processor 170 may predict collision with a pedestrian positioned in front of the vehicle 700 based on the distance and relative speed of the pedestrian. For example, the processor 170 may calculate the time to collision (TTC) with the pedestrian positioned in front of the vehicle 700. If the TTC is less than a reference value, the processor 170 may predict occurrence of collision. Herein, the Colusa may be a primary collision.

When secondary collision occurs after the primary collision with the pedestrian occurs, the processor 170 may provide a suspension height control signal such that the head of the pedestrian is positioned in one area of the hood of the driver's vehicle 700.

Herein, the one area of the hood may be an area in which a pedestrian airbag inflates when collision with a pedestrian occurs. Alternatively, the one area of the hood may be an area in which the hood pops up when collision with a pedestrian occurs.

The hood of the vehicle 700 is designed to absorb shock in preparation of secondary collision with a pedestrian. In addition, the vehicle 700 may include a hood pop-up apparatus to absorb shock applied to a pedestrian by popping up when collision with the pedestrian occurs. The vehicle 700 may include a pedestrian protection airbag. If the head of the pedestrian is positioned in one area of the hood when a secondary collision occurs after the primary collision with the pedestrian, shock applied to the pedestrian may be minimized.

When the vehicle is suddenly braked with collision with a pedestrian predicted, the processor 170 may provide a height control signal for the front wheel suspensions.

When the vehicle is suddenly braked, a nose dive phenomenon occurs. In this case, the front end of the vehicle 700 is inclined downward and the rear end of the vehicle 700 is inclined upward.

In this case, the pedestrian may not collide with an expected impacted portion of the bumper which is properly designed in preparation of collision with the pedestrian. In addition, if the driver's vehicle 700 collides with the pedestrian while nose dive occurs, initial contact with the pedestrian may be made on the part of the pedestrian below the knees of the pedestrian. In this case, the pedestrian's head may collide with the windshield or roof of the driver's vehicle 700 rather than with one area of the hood of the vehicle 700. Thereby, severe shock is likely to be applied to the pedestrian. According, by providing a height control signal for the front wheel suspensions when the vehicle is suddenly braked with collision predicted as in this example, the pedestrian may be protected.

The processor 170 may provide a suspension height control signal based on the height of a pedestrian detected in a vehicle front view image or surroundings-of-vehicle image.

The processor 170 may detect the height of a pedestrian. Herein, the height of the pedestrian may be the stature of the pedestrian.

The processor 170 may detect the actual height of an object based on the height of the pedestrian image and the distance to the pedestrian which are detected in the image.

For example, the processor 170 may detect an actual height of the object based on variation of the height of the pedestrian image and the distance to the pedestrian over time. For example, the processor 170 may detect the actual height of the object by comparing the height of the pedestrian image with the distance to the pedestrian. For example, the processor 170 may generate a depth map based on stereo images or a TOF image and detect the actual height of the object in the depth map.

The processor 170 may determine whether the height of the pedestrian is greater than or equal to a first reference value. If the height of the pedestrian is greater than or equal to the first reference value, the processor 170 may provide a control signal for raising the front wheel suspensions.

For example, the processor 170 may provide a control signal for raising the front wheel suspensions such that an initial contact is made between one area of the front bumper of the driver's vehicle 700 and the knees of the pedestrian. In this case, the pedestrian's head may be positioned in one area of the hood of the driver's vehicle 700 when the secondary collision occurs.

When the vehicle is suddenly braked, nose dive may occur on the vehicle 700. In this case, the front end of the vehicle 700 is inclined downward and the rear end of the vehicle 700 is inclined upward.

If the driver's vehicle 700 collides with the pedestrian while nose dive occurs, initial contact with the pedestrian may be made on the part of the pedestrian below the knees of the pedestrian. In this case, the pedestrian's head may collide with the windshield or roof of the driver's vehicle 700 rather than with one area of the hood of the vehicle 700. Thereby, severe shock is likely to be applied to the pedestrian. Accordingly, by controlling the suspension to adjust a portion of the pedestrian which will make an initial contact with the bumper of the driver's vehicle 700 when collision occurs, the pedestrian may be protected when the secondary collision occurs.

The processor 170 may determine whether the height of the pedestrian is less than or equal to a second reference value. If the height of the pedestrian is less than or equal to the second reference value, the processor 170 may provide a control signal for lowering the front wheel suspensions.

For example, the processor 170 may provide a control signal for lowering the front wheel suspensions such that an initial contact is made between one area of the front bumper of the driver's vehicle 700 and the knees of the pedestrian.

When the vehicle is suddenly braked, nose dive may occur on the vehicle 700. In this case, the front end of the vehicle 700 is inclined downward and the rear end of the vehicle 700 is inclined upward.

If the height of the pedestrian is less than or equal to the second reference value rather than being greater than or equal to the first reference value when collision between the driver's vehicle 700 and the pedestrian occurs, the driver's vehicle 700 may collide with the upper body of the pedestrian even if the nose dive occurs. In this case, internal organs of the pedestrian may be damaged. Accordingly, by controlling the front wheel suspensions to be lowered, damage to the pedestrian may be minimized. In addition, by controlling the suspensions, the pedestrian may be protected in the manner that the pedestrian's head is positioned in one area of the hood of the driver's vehicle 700 when the secondary collision occurs.

The first reference value and the second reference value may be reference values for positioning the pedestrian's head in one area of the hood of the driver's vehicle 700 when the secondary collision course after the primary collision between the front bumper of the vehicle 700 and the pedestrian. Herein, one area of the hood may be an area in which a pedestrian airbag inflates when collision with the pedestrian occurs. Alternatively, the one area of the hood may be a part of the hood that pops up when collision with the pedestrian occurs.

For example, the first reference value and the second reference value may be reference values for causing a part of the front bumper of the vehicle 700 to make an initial contact with the knees of the pedestrian when primary collision with the pedestrian occurs. The reference value may be determined based on the height of an adult. The second reference value may be determined based on the height of a child.

The processor 170 may provide a suspension height control signal such that shock resulting from the secondary collision with an object after the primary collision with the object is absorbed. Herein, the object may be a pedestrian.

The processor 170 may provide a control signal for lowering the front wheel suspensions when the secondary collision occurs after the primary collision with the object. By lowering the front wheel suspensions, the vehicle 700 may absorb shock in the direction in which the object falls. In this case, the vehicle 700 may absorb shock applied to the object when the secondary collision occurs.

After the primary collision with the object occurs, the processor 170 may detect a height to which the object is lifted in a vehicle front view image or surroundings-of-vehicle image. The processor 170 may provide a control signal for lowering the front wheel suspensions based on the detected lift height of the object when the secondary collision occurs. For example, the processor 170 may determine time to lower the front wheel suspensions based on the lift height of the object. For example, the processor 170 may determine the degree by which the front wheel suspensions are to be lowered, based on the lift height of the object.

After the primary collision with the object occurs, the processor 170 may detect a direction in which the object is lifted in a vehicle front view image or surroundings-of-vehicle image. Based on the detected direction in which the object is lifted, the processor 170 may provide a control signal such that the height of the front left wheel suspension becomes different from that of the front right wheel suspension when the secondary collision occurs.

For example, if the lift direction of the object is directed to the left with respect to the forward travel direction of the vehicle 700, the processor 170 may provide a control signal such that the front left wheel suspension is lowered compared to the front right wheel suspension.

For example, if the lift direction of the object is directed to the right with respect to the forward travel direction of the vehicle 700, the processor 170 may provide a control signal such that the front right wheel suspension is lowered compared to the front left wheel suspension.

By controlling the heights of the front left wheel suspension and the front right wheel suspension differently according to the lift direction of the object as above, shock applied to the object may be further reduced.

The processor 170 may provide a control signal such that the hood of the vehicle 700 pops up when the secondary collision occurs after the primary collision with the object.

By causing the hood to pop up, the vehicle 700 may absorb shock applied to the pedestrian when the secondary collision occurs.

In some implementations, after the primary collision with the object occurs, the processor 170 may detect a lift height of the object in a vehicle front view image or surroundings-of-vehicle image. The processor 170 may provide a control signal based on the detected lift height of the object such that the hood of the vehicle 700 pops up when the secondary collision occurs. For example, the processor 170 may determine the time for the hood to pop up based on the lift height of the object. For example, the processor 170 may determine the degree by which the pops up based on the lift height of the object.

The hood of the vehicle 700 may be popped up by operation of a first actuator disposed on the left side of the driver's vehicle 700 and a second actuator disposed on the right side of the driver's vehicle 700. Herein, the first and second actuators may be hydraulic or electric actuators. The first and second actuators may be operated according to a control signal provided from the processor 170.

After the primary collision with the object occurs, the processor 170 may detect the direction in which the object is lifted in a vehicle front view image or a surroundings-of-vehicle image. The processor 170 may provide a control signal based on the detected lift direction of the object such that the degree of operation of the first actuator is different from the degree of operation of the second actuator when the secondary collision occurs.

For example, if the lift direction of the object is directed to the left with respect to the forward travel direction of the vehicle 700, the processor 170 may provide a control signal such that the operational displacement of the first actuator is larger than that of the second actuator. In this case, the left portion of the hood may be raised higher than the right portion of the hood.

For example, if the lift direction of the object is directed to the right with respect to the forward travel direction of the vehicle 700, the processor 170 may provide a control signal such that the operational displacement of the second actuator is larger than that of the first actuator. In this case, the right portion of the hood may be raised higher than the left portion of the hood.

By controlling the degrees of operations of the first actuator and the second actuator differently, the lift direction of the object, shock applied to the object may be further reduced.

In some implementations, the processor 170 may detect a curve in a vehicle front view image. The processor 170 may control the height of the left wheel suspensions or right wheel suspensions in response to the detected curve.

The processor 170 may receive travel speed information about the vehicle 700 from the sensing unit 760 through the interface unit 130. The processor 170 may provide a left or right wheel suspension height control signal in response to the curvature of the detected curve and the entrance speed on the curve.

In some implementations, the processor 170 may perform communication with a power source drive unit 751 through the interface unit 130. When collision with the detected object is predicted, the processor 170 may provide a control signal to the power source drive unit 751 such that driving power is not transferred to the driver's vehicle 700.

For example, if the vehicle 700 is an internal combustion engine vehicle, a control signal for closing the throttle valve may be provided to the throttle body to interrupt the supply of fuel.

For example, if the vehicle 700 is an electric vehicle, a control signal may be provided to a motor controller for controlling the motor such that the motor is not driven.

By interrupting driving power of the vehicle when collision with an object is predicted, a secondary accident such as an explosion may be prevented.

In some implementations, the processor 170 may detect a road surface in a front view image of the vehicle or a surroundings-of-vehicle image. The processor 170 may generate road surface condition information by analyzing the detected road surface. The processor 170 may provide a suspension height control signal based on the road surface condition information.

The processor 170 may receive trunk opening information from the controller 770 or the sensing unit 760 through the interface unit 130.

For example, when an input for opening the trunk is received from the user through a user input unit 174, the processor 170 may receive the input from the user input unit 724 or the controller 770 via the interface unit 130.

For example, if the sensing unit 760 includes a trunk opening sensor, the processor 170 may receive the trunk opening information from the sensing unit 760.

When the trunk is opened, the processor 170 may provide a control signal for lowering the suspension of the rear wheels.

As the suspensions of the rear wheels are lowered when the trunk is opened, the user can easily take objects out of the trunk.

In some implementations, the processor 170 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units for performing other functions.

The processor 170 may be controlled by the controller 770.

The display unit 180 may display various kinds of information processed by the processor 170. The display unit 180 may display an image related to operation of the driver assistance apparatus 100. To display such image, the display unit 180 may include a cluster or HUD on the inner front of the vehicle. If the display unit 180 is an HUD, the unit may include a projection module for projecting an image onto the windshield of the vehicle 700.

The audio output unit 185 may output sound based on an audio signal processed by the processor 170. To this end, the audio output unit 185 may include at least one speaker.

An audio input unit may receive a user's voice. To this end, the unit may include a microphone. The received voice may be converted into an electrical signal and delivered to the processor 170.

The power supply 190 may be controlled by the processor 170 to supply electric power necessary for operation of respective constituents. In particular, the power supply 190 may receive power from, for example, a battery in the vehicle.

The camera 195 acquires a vehicle front view image or a surroundings-of-vehicle image. The camera 195 may be a mono camera or stereo cameras 195a and 195b for capturing the vehicle front view image. Alternatively, the camera 195 may be around view cameras 195d, 195e, 195f and 195g for capturing the surroundings-of-vehicle image.

The camera 195 may include an interior camera 195c. The interior camera 195c may capture images of the interior of the vehicle 700. Preferably, the interior camera 195c is disposed on the cockpit module.

The interior camera 195c may acquire an image of passengers.

By acquiring the image of the passengers in the vehicle 700, the interior camera 195c may detect the number of passengers.

The camera 195 may include an image sensor (e.g., CMOS or CCD) and an image processing module.

The camera 195 may process a still image or a moving image obtained by the image sensor. The image processing module may process the still image or the moving image acquired through the image sensor. According to some implementations, the image processing module may be configured separately from the processor 170 or integrated with the processor 170.

FIG. 3B is an internal block diagram of the driver assistance apparatus 100 according to another implementation.

Referring to FIG. 3B, the driver assistance apparatus 100 of FIG. 3B differs from the driver assistance apparatus 100 of FIG. 3A in that the driver assistance apparatus 100 of FIG. 3B includes stereo cameras 195a and 195b. Hereinafter, description will be given focusing on this difference.

The driver assistance apparatus 100 may include first and second cameras 195a and 195b. Herein, the first and second cameras 195a and 195b may be referred to as stereo cameras.

The stereo cameras 195a and 195b may be detachably formed on the ceiling or windshield of the vehicle 700. The stereo cameras 195a and 195b may include a first lens 193a and a second lens 193b.

The stereo cameras 195a and 195b may respectively include a first light shield 192a and a second light shield 192b for blocking light incident on the first lens 193 and the second lens 193b.

The first camera 195a acquires a first image of the front view of the vehicle. The second camera 195b acquires a second image of the front view of the vehicle. The second camera 195b is spaced a predetermined distance from the first camera 195a. As the first and second cameras 195a and 195b are spaced the predetermined distance from each other, disparity occurs and a distance to an object is detectable according to the disparity.

If the driver assistance apparatus 100 includes the stereo cameras 195a and 195b, the processor 170 performs signal processing based on computer vision. Thereby, the processor 170 may acquire stereo images of the front view of the vehicle from the stereo cameras 195a and 195b, perform disparity calculation for the front view of the vehicle based on the stereo images, perform object detection in at least one of the stereo images based on the calculated disparity information, and continue tracking movement of an object after object detection. Herein, the stereo images are based on the first image received from the first camera 195a and the second image received from the second camera 195b.

In particular, in detecting an object, the processor 170 may perform lane detection (LD), vehicle detection (VD), pedestrian detection (PD), bright-spot detection (BD), traffic sign recognition (TSR), and road surface detection.

In addition, the processor 170 may calculate the distance to a detected nearby vehicle, the speed of the detected vehicle, and difference in speed from the detected vehicle.

FIG. 3C is an internal block diagram of the driver assistance apparatus 100 according to another implementation.

Referring to FIG. 3C, the driver assistance apparatus 100 of FIG. 3C differs from the driver assistance apparatus 100 of FIG. 3A in that the driver assistance apparatus 100 of FIG. 3C includes around view cameras 195d, 195e, 195f and 195g. Hereinafter, description will be given focusing on this difference.

The driver assistance apparatus 100 may include around view cameras 195d, 195e, 195f and 195g.

Each of the around view cameras 195d, 195e, 195f and 195g may include a lens and a light shield for blocking light traveling toward the lens.

The around view cameras may include a left camera 195d, a rear camera 195e, a right camera 195f and a front camera 195g.

The left camera 195d acquires an image of the left side of the vehicle. The rear camera 195e acquires an image of the rear of the vehicle. The right camera 195f acquires an image of the right side view of the vehicle. The front camera 195g acquires an image of the front of the vehicle.

Images acquired by the around view cameras 195d, 195e, 195f and 195g are transferred to the processor 170.

The processor 170 may synthesize a left side view image, rear view image, right side view image and front view image of the vehicle to generate a surroundings-of-vehicle image. In this case, the surroundings-of-vehicle image may be a top view image or bird's eye view image. The processor 170 may receive and synthesize the left side view image, rear view image, right side view image and front view image of the vehicle, and convert the synthesized image into a top view image to generate a surroundings-of-vehicle image.

The processor 170 may detect an object based on the surroundings-of-vehicle image. In particular, in detecting an object, the processor 170 may perform lane detection (LD), vehicle detection (VD), pedestrian detection (PD), bright-spot detection (BD), traffic sign recognition (TSR), and road surface detection.

The processor 170 may individually control zoom of the around view cameras 195d, 195e, 195f and 195g. Zoom control of the processor 170 may be performed in the same manner as zoom control of the stereo cameras described above with reference to FIG. 3B.

Figure 4A:
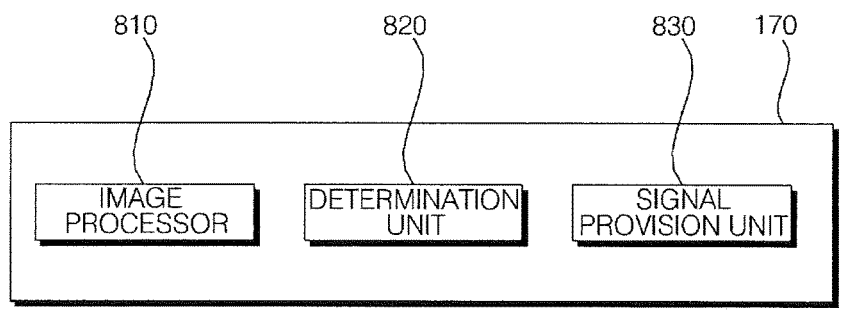
FIGS. 4A to 4C are internal block diagrams illustrating examples of a processor of a driver assistance apparatus (e.g., the processor of FIGS. 3A to 3C)
Figure 4B:
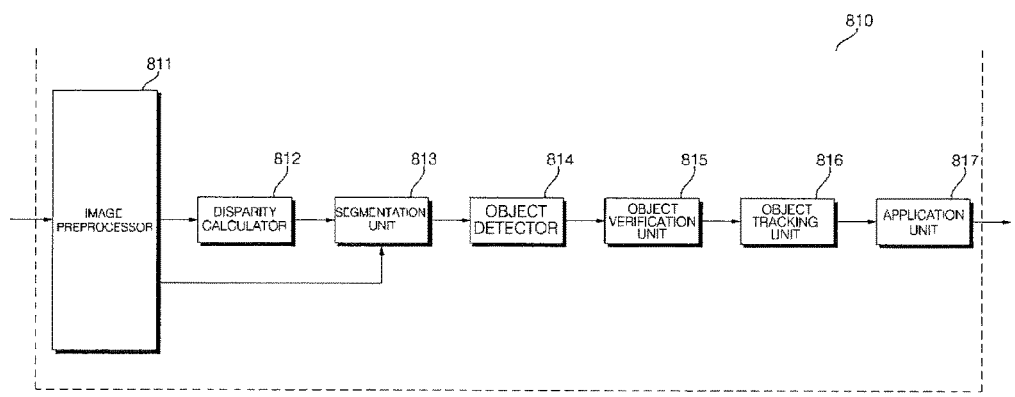
Figure 4C:
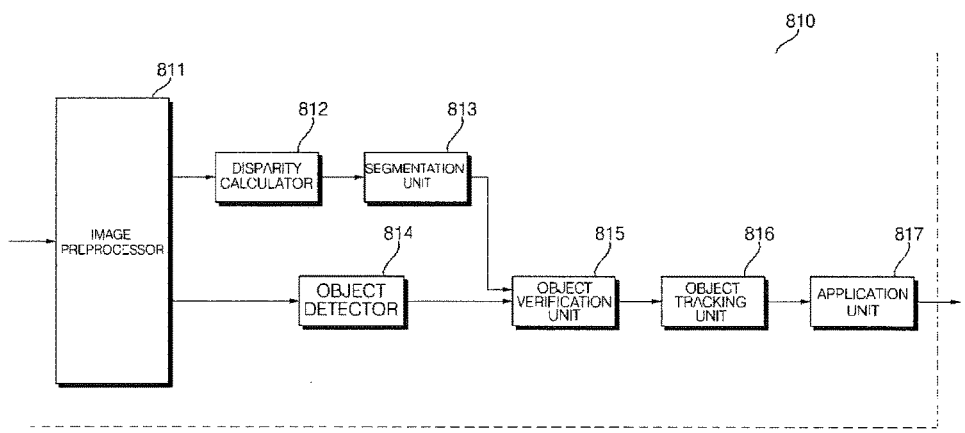

FIGS. 4A to 4C are exemplary internal block diagrams of the processor of FIGS. 3A to 3C, and FIGS. 5A and 5B illustrate operation of the processor of FIGS. 4A to 4C.

Referring to FIG. 4A, the processor 170 may include an image processor 810, a determination unit 820 and a signal provision unit 830.

The image processor 810 may receive an image from the camera 195. Herein, the images may be a vehicle front view image or a surroundings-of-vehicle image. The image may be captured by a mono camera, stereo cameras or around view cameras.

The image processor 810 may detect a drive lane and an object by processing the received image. Herein, the object may be a pedestrian. In some implementations, the image processor 810 may detect a curve section in front of the vehicle based on the drive lane. The image processor 810 may detect the condition of the road surface.

The image processor 810 may detect the height of a pedestrian. The image processor 810 may detect a lift height of the pedestrian after the primary collision between the driver's vehicle 700 and the pedestrian occurs. The image processor 810 may detect the raising direction of the pedestrian after the primary collision between the vehicle 700 and the pedestrian occurs.

The image processor 810 may track an identified object.

Hereinafter, object detection performed by the image processor 810 will be described in detail with reference to FIGS. 4B and 4C.

The determination unit 820 may predict collision with an object. For example, the processor 170 may predict collision with an object based on the distance and relative speed of the object. For example, the processor 170 may compute the time to collision (TTC) with the object. If the TTC is less than or equal to a reference value, the processor 170 may predict occurrence of collision with the object.

For example, the determination unit 820 may predict collision with a pedestrian.

The determination unit 820 may determine whether the height of the detected pedestrian is greater than or equal to a first reference value. In addition, the determination unit 820 may determine whether the height of the detected pedestrian is greater than or equal to a second reference value.

The signal provision unit 830 may provide a control signal to the vehicle drive unit 750.

The signal provision unit 830 may provide a suspension height control signal to the suspension drive unit 759. The suspension drive unit 759 may control the suspension apparatus according to the suspension height control signal.

The signal provision unit 830 may provide a steering control signal to the steering drive unit 752. The steering drive unit 752 may control the steering apparatus according to the steering control signal.

The signal provision unit 830 may provide a power interruption control signal to the power source drive unit 751. The power source drive unit 751 may control the power source according to the power interruption control signal.

The signal provision unit 830 may provide a full-braking control signal to the brake drive unit 753. The brake drive unit 753 may control the brake apparatus according to the full-braking control signal.

Referring to FIG. 4B, which is an exemplary internal block diagram of the image processor 401, the image processor 401 may include an image preprocessor 811, a disparity calculator 812, an object detector 814, an object tracking unit 816, and an application unit 817.

The image preprocessor 811 may receive an image from the camera 195 and perform preprocessing of the image.

Specifically, the image preprocessor 811 may perform noise reduction, rectification, calibration, color enhancement, color space conversion (CSC), interpolation and camera gain control for the image. Thereby, a clearer image than the stereo image captured by the camera 195 may be acquired.

The disparity calculator 812 may receive an image signal-processed by the image preprocessor 811, perform stereo matching upon the received image, and acquire a disparity map according to the stereo matching. That is, the disparity calculator 812 may acquire disparity information on the stereo image of the front view of the vehicle.

Herein, stereo matching may be performed in a pixel unit or a predetermined block unit of the stereo image. The disparity map may represent a map indicating numerical values representing binocular parallax information about the stereo images.

The segmentation unit 813 may perform segmentation and clustering of at least one of the images based on the disparity information from the disparity calculator 812.

Specifically, the segmentation unit 813 may separate the background from the foreground in at least one of the stereo images based on the disparity information.

For example, a region of the disparity map which has disparity information less than or equal to a predetermined value may be calculated as the background and excluded. Thereby, the foreground may be separated from the background.

As another example, a region having disparity information greater than or equal to a predetermined value in the disparity map may be calculated as the foreground and the corresponding part may be excluded. Thereby, the foreground may be separated from the background.

By separating the foreground from the background based on the disparity information extracted based on the stereo images, signal processing speed may be increased and signal-processing load may be reduced in the subsequent object detection operation.

The object detector 814 may detect an object based on an image segment from the segmentation unit 813.

For example, the object detector 814 may detect an object in at least one of images based on the disparity information.

Specifically, the object detector 814 may detect an object in at least one of the images. For example, the object detector 814 may detect an object in the foreground separated by the image segment.

Next, the object verification unit 815 may classify and verify the separated object.

To this end, the object verification unit 815 may use an identification technique employing a neural network, a support vector machine (SVM) technique, an identification technique based on AdaBoost using Haar-like features or the histograms of oriented gradients (HOG) technique.

In some implementations, the object verification unit 815 may verify an object by comparing the detected object with objects stored in the memory 140.

For example, the object verification unit 815 may verify a nearby vehicle, a lane, a road surface, a signboard, a dangerous area, a tunnel, and the like which are positioned around the vehicle.

The object tracking unit 816 may track the verified object. For example, the object tracking unit 816 may sequentially perform verification of an object in the acquired stereo images and computation of the motion or motion vector of the verified object, thereby tracking movement of the object based on the computed motion or motion vector. Thereby, the object tracking unit 816 may track a nearby vehicle, a lane, a road surface, a signboard, a hazard zone, a tunnel, and the like which are positioned around the vehicle.

Next, the application unit 817 may calculate dangerousness to the vehicle 700 based on various objects positioned near the vehicle, for example, another vehicle, a lane, a road surface, a signboard, and the like. In addition, the application unit 817 may calculate possibility of collision with a preceding vehicle and slippage of the vehicle.

In addition, the application unit 817 may output a message for delivering information such as the calculated dangerousness, collision possibility or slippage as driving assistance information. Alternatively, the application unit 817 may generate a control signal for controlling the position or movement of the vehicle 700 as a vehicle control information.

Figure 7:
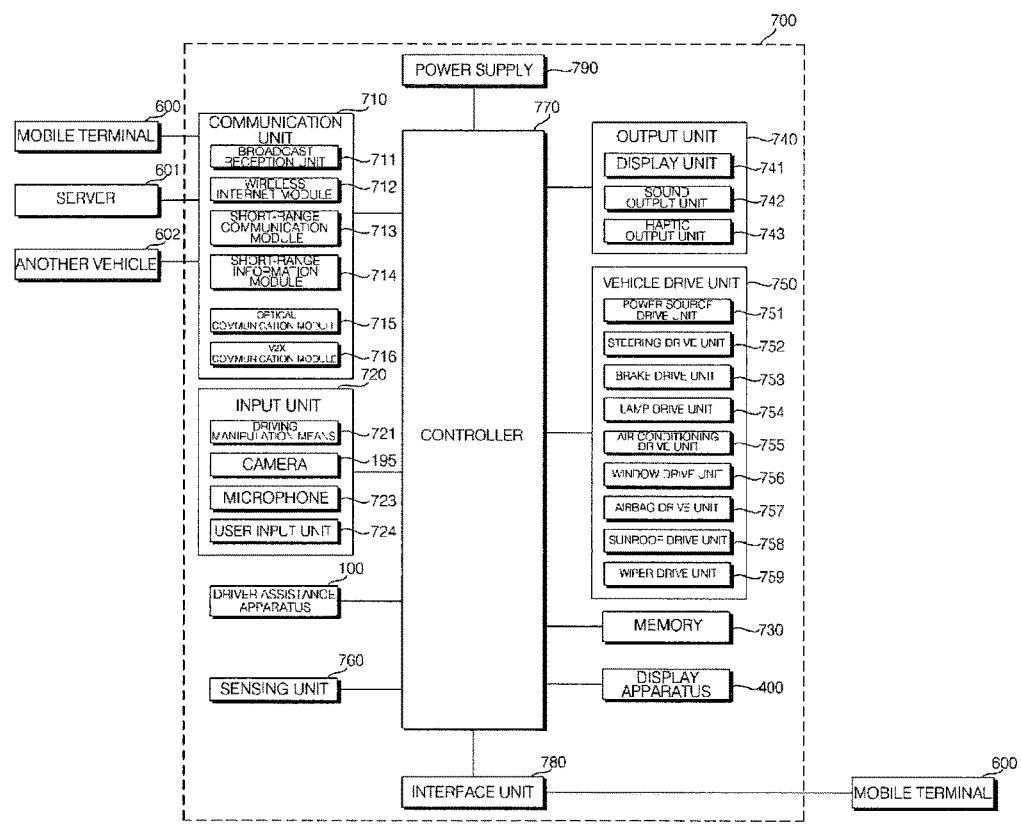
FIG. 7 is an internal block diagram illustrating an example of a vehicle that includes a driver assistance apparatus.

The image preprocessor 811, the disparity calculator 812, the segmentation unit 813, the object detector 814, the object verification unit 815, the object tracking unit 816 and the application unit 817 may be internal constituents of the image processor 810 in the processor 170 in FIG. 7 and subsequent figures.

According to an implementation, the processor 170 may include only some of the imaging preprocessor 811, the disparity calculator 812, the segmentation unit 813, the object detector 814, the object verification unit 815, the object tracking unit 816 and the application unit 817. For example, if the camera 195 is a mono camera or an around view camera, the disparity calculator 812 may be excluded. According to an implementation, the segmentation unit 813 may be excluded.

FIG. 4C is another exemplary internal block diagram of the processor.

Referring to FIG. 4C, the image processor 401 of FIG. 4C has the same internal constituent units as those of the image processor 401 of FIG. 4B, but has a different signal processing sequence. Hereinafter, the different signal processing sequence will be described.

The object detector 814 may receive stereo images and detect an object in at least one of the stereo images. In contrast with the example of FIG. 4B, the object may be directly detected in the stereo images rather than being detected in a segmented image based on the disparity information.

Next, the object verification unit 815 classifies and verifies an object detected and separated based on an image segment from the segmentation unit 813 and objects detected by the object detector 814.

To this end, the object verification unit 815 may use an identification technique employing a neural network, the support vector machine (SVM) technique, an identification technique based on AdaBoost using Haar-like features, or the histograms of oriented gradients (HO G) technique.

Figure 5A:
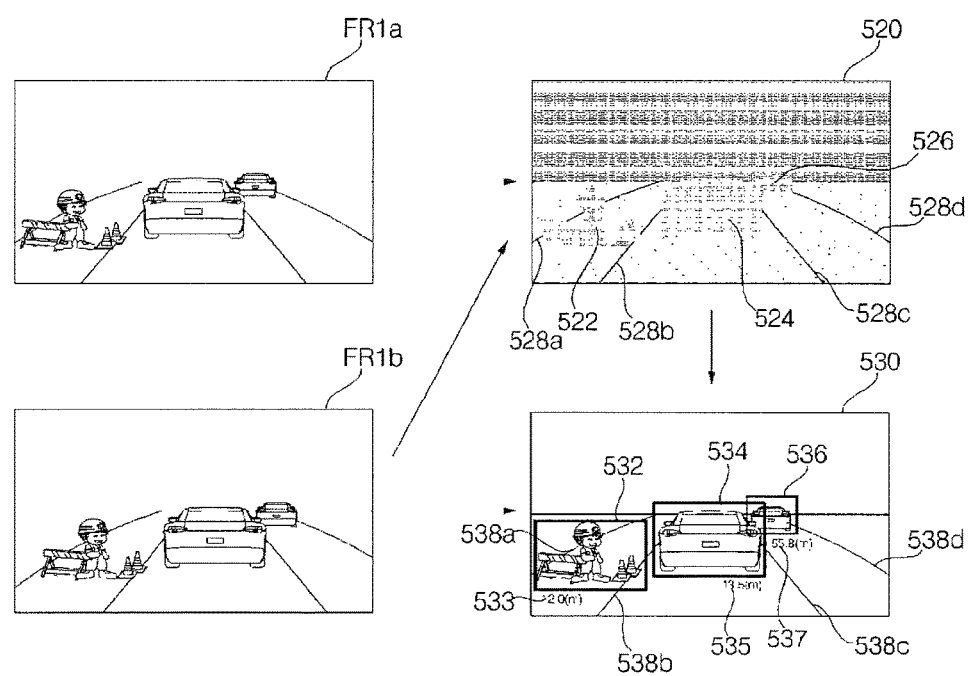
FIGS. 5A and 5B illustrate an example of operations of a processor of a driver assistance apparatus (e.g., the processor 170 of FIGS. 4A to 4C) based on stereo images acquired in first and second frame intervals, respectively.
Figure 5B:
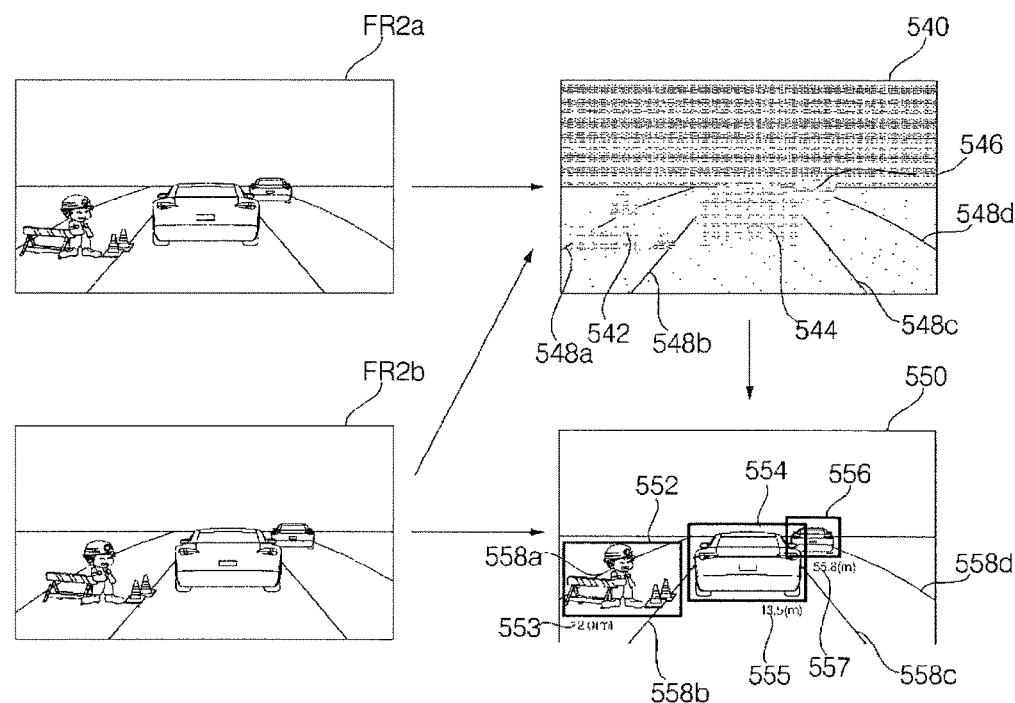

FIGS. 5A and 5B illustrate operation of the processor 170 of FIGS. 4A to 4C based on stereo images acquired in first and second frame intervals, respectively.

Referring to FIG. 5A, the stereo camera 195 acquires a stereo image in the first frame interval.

The disparity calculator 812 in the processor 170 receives stereo images FR1$a$ and FR1$b$ signal-processed by the image preprocessor 811, and performs stereo matching for the received stereo images FR1$a$ and FR1$b$, thereby acquiring a disparity map 520.

The disparity map 520 provides levels of disparities between the stereo images FR1$a$ and FR1$b$. The disparity level may be inversely proportional to the distance to the vehicle.

When the disparity map is displayed, high brightness may be provided to a high disparity level and a low brightness may be provided to a low disparity level.

In FIG. 5A, first to fourth lane lines 528a, 528b, 528c, and 528d have corresponding disparity levels and a construction area 522, a first preceding vehicle 524 and a second preceding vehicle 526 have corresponding disparity levels in the disparity map 520.

The segmentation unit 432, the object detector 814, and the object verification unit 436 perform segmentation, object detection and object verification for at least one of the stereo images FR1a and FR1b based on the disparity map 520.

In the example illustrated in the figure, object detection and verification are performed for the second stereo image FR1b using the disparity map 520.

For example, object detection and verification may be performed for the first to fourth lane lines 538a, 538b, 538c, and 538d, the construction area 532, the first preceding vehicle 534, and the second preceding vehicle 536.

Next, referring to FIG. 5B, the stereo camera 195 acquires a stereo image in the second frame interval.

The disparity calculator 812 in the processor 170 receives stereo images FR2a and FR2b signal-processed by the image preprocessor 811, and performs stereo matching on the received stereo images FR2a and FR2b, thereby acquiring a disparity map 540.

In the figure, first to fourth lane lines 548a, 548b, 548c, and 548d have corresponding disparity levels, and a construction area 542, a first preceding vehicle 544 and a second preceding vehicle 546 have corresponding disparity levels in the disparity map 540.

The segmentation unit 432, the object detector 814, and the object verification unit 436 performs segmentation, object detection and object verification for at least one of the stereo images FR2a and FR2b based on the disparity map 540.

The figure illustrates object detection and verification performed for the second stereo image FR2b using the disparity map 540.

For example, object detection and verification may be performed for the first to fourth lane lines 548a, 548b, 548c, and 548d, construction area 552, first preceding vehicle 554, and second preceding vehicle 556 in the image 550.

The object tracking unit 816 may track a verified object by comparing FIGS. 5A and 5B.

Specifically, the object tracking unit 816 may track movement of an object based on motions or motion vectors f respective objects verified in FIGS. 5A and 5B. Thereby, lanes, a construction area, a first preceding vehicle, a second preceding vehicle and the like positioned around the vehicle may be tracked.

Figure 6A:
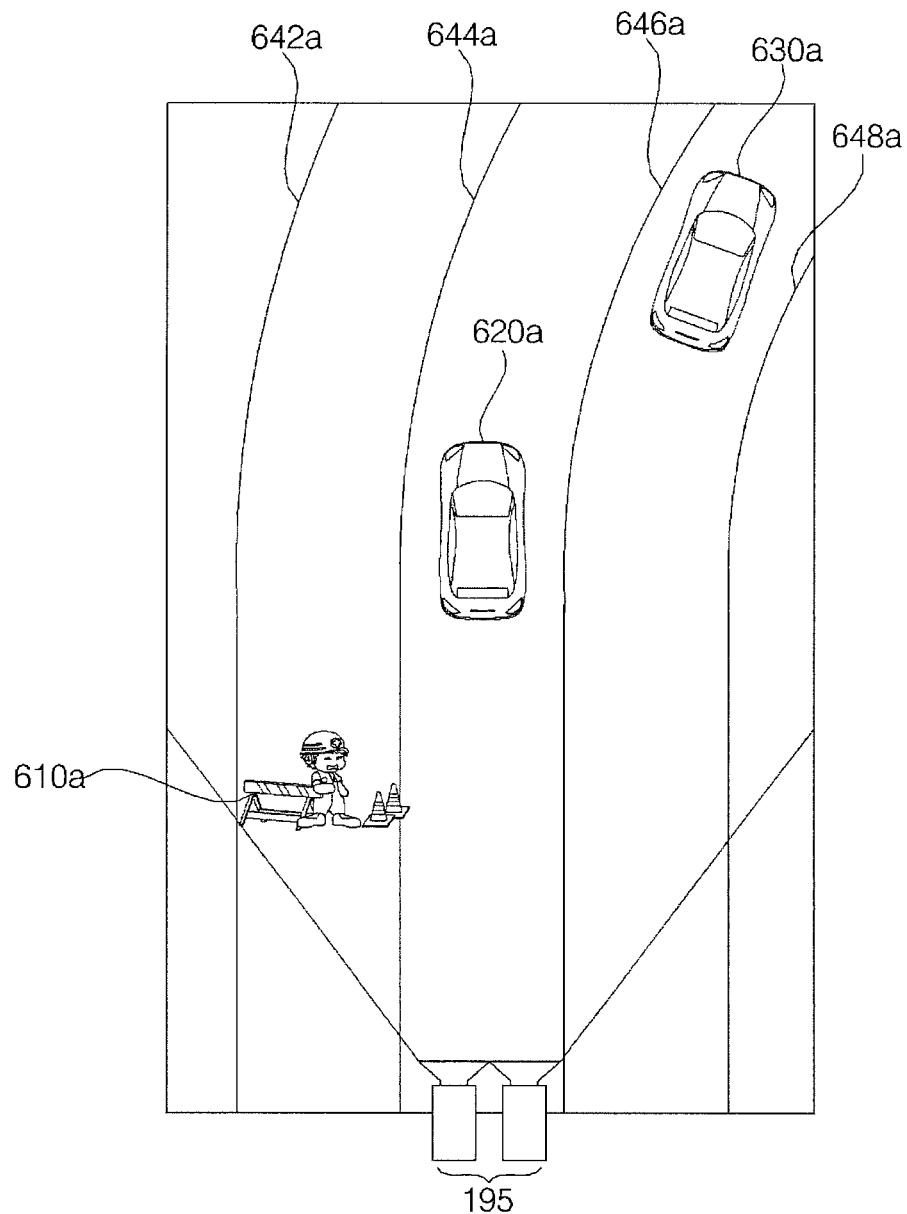
FIGS. 6A and 6B illustrate examples of operations of a driver assistance apparatus.
Figure 6B:
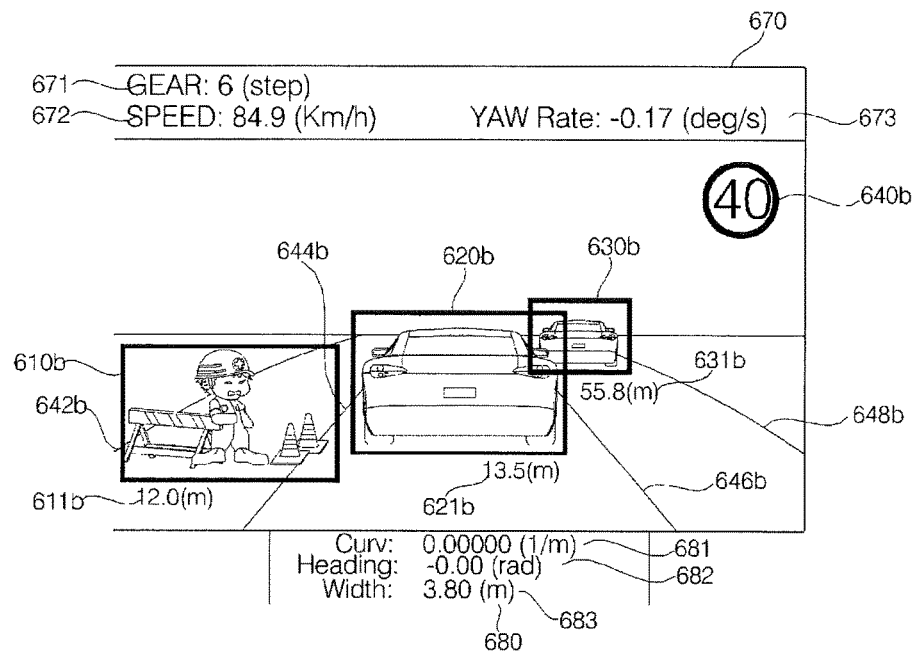

FIGS. 6A and 6B illustrate operation of the driver assistance apparatus of FIGS. 3A to 3C.

FIG. 6A illustrates an examples of a front situation of the vehicle whose images are captured by the stereo camera 195 provided in the vehicle. In particular, the vehicle front situation is displayed as a bird's eye view image.

Referring to FIG. 6A, a first lane line 642a, a second lane line 644a, a third lane line 646a, and a fourth lane line 648a are positioned from left to right. A construction area 610a is positioned between the first lane line 642a and the second lane line 644a, a first preceding vehicle 620a is positioned between the second lane line 644a and the third lane line 646a, and a second preceding vehicle 630a is positioned between the third lane line 646a and the fourth lane line 648a.

FIG. 6B illustrates displaying a vehicle front situation recognized by the driver assistance apparatus along with various kinds of information. In particular, the image shown in FIG. 6B may be displayed by the display unit 180, the vehicle display apparatus 400 or the display unit 741, which is provided by the driver assistance apparatus.

FIG. 6B illustrates displaying information based on images captured by the stereo camera 195, in contrast with the example of FIG. 6A.

Referring to FIG. 6B, a first lane line 642b, a second lane line 644b, a third lane line 646b, and a fourth lane line 648b are presented from the left to the right. A construction area 610b is positioned between the first lane line 644b and the second lane line 644b, a first preceding vehicle 620b is positioned between the second lane line 644b and the third lane line 646b, and a second preceding vehicle 630b is positioned within the third lane line 646b and the fourth lane line 648b.

The driver assistance apparatus 100 may perform signal processing based on the stereo images captured by the stereo cameras 195a and 195b, thereby verifying objects corresponding to the construction area 610b, the first preceding vehicle 620b and the second preceding vehicle 630b. In addition, the driver assistance apparatus 100 may verify the first lane line 642b, the second lane line 644b, the third lane line 646b and the fourth lane line 648b.

In the figure, to indicate that the objects corresponding to the construction area 610b, the first preceding vehicle 620b and the second preceding vehicle 630b are verified, the objects are highlighted using edge lines.

The driver assistance apparatus 100 may calculate distance information on the construction area 610b, the first preceding vehicle 620b and the second preceding vehicle 630b based on the stereo images captured by the stereo camera 195.

In the figure, first calculated distance information 611b, second calculated distance information 621b and third calculated distance information 631b corresponding to the construction area 610b, the first preceding vehicle 620b and the second preceding vehicle 630b respectively are displayed.

The driver assistance apparatus 100 may receive sensor information about the vehicle from the controller 770 or the sensing unit 760. In particular, the driver assistance apparatus 100 may receive and display the vehicle speed information, gear information, yaw rate information indicating a variation rate of the yaw of the vehicle and orientation angle information about the vehicle.

In the figure, vehicle speed information 672, gear information 671 and yaw rate information 673 are displayed on the upper portion 670 of the vehicle front view image, and vehicle orientation angle information 682 is displayed on the lower portion 680 of the vehicle front view image. However, various examples other than the illustrated example are possible. Additionally, vehicle width information 683 and road curvature information 681 may be displayed along with the vehicle orientation angle information 682.

The driver assistance apparatus 100 may receive speed limit information about the road on which the vehicle is traveling, through the communication unit 120 or the interface unit 130. In the figure, the speed limit information 640b is displayed.

The driver assistance apparatus 100 may display various kinds of information shown in FIG. 6B through, for example, the display unit 180. Alternatively, the driver assistance apparatus 100 may store the various kinds of information without a separate display operation. In addition, the information may be utilized for various applications.

FIG. 7 is an exemplary internal block diagram of the vehicle of FIG. 1.

The vehicle 700 may include a communication unit 710, an input unit 720, a sensing unit 760, an output unit 740, a vehicle drive unit 750, a memory 730, an interface unit 780, a controller 770, a power supply 790, a driver assistance system 100, and a display apparatus 400 for the vehicle.

The communication unit 710 may include at least one module enabling wireless communication between the vehicle 700 and a mobile terminal 600, between the vehicle 700 and an external server 601, or between the vehicle 700 and another vehicle 602. The communication unit 710 may also include at least one module for connecting the vehicle 700 to at least one network.

The communication unit 710 may include a broadcast reception module 711, a wireless Internet module 712, a short-range communication module 713, a location information module 714, an optical communication module 715, and a V2X communication module 716.

The broadcast reception module 711 receives a broadcast signal or broadcast-related information from an external broadcast management server over a broadcast channel. Herein, the broadcast includes radio broadcast or TV broadcast.

The wireless Internet module 712, which refers to a module for wireless Internet access, may be internally or externally installed to the vehicle 700. The wireless Internet module 712 is configured to transmit and receive a radio signal over a communication network according to wireless Internet technologies.

Examples of wireless Internet technologies include Wireless LAN (WLAN), Wi-Fi, Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A). The wireless Internet module 712 transmits and receives data according to at least one of the aforementioned wireless Internet technologies. For example, the wireless Internet module 712 may wirelessly exchange data with the external server 601. The wireless Internet module 712 may receive weather information and traffic situation information (e.g., TPEG (Transport Protocol Expert Group)) from the external server 601.

The short-range communication module 713, which is used for short-range communication, may support short-range communication using at least one of Bluetooth™, Radio Frequency Identification (RFID), Infrared Data Association (IrDA), ultra-wideband (UWB), ZigBee, Near Field Communication (NFC), Wi-Fi, Wi-Fi Direct, and Wireless Universal Serial Bus (Wireless USB) technologies.

The short-range communication module 713 may establish a wireless local area network to implement short-range communication between the vehicle 700 and at least one external device. For example, the short-range communication module 713 may wirelessly exchange data with the mobile terminal 600. The short-range communication module 713 may receive weather information and traffic situation information (e.g., TPEG (Transport Protocol Expert Group)) from the mobile terminal 600. For example, once a user enters the vehicle 700, the mobile terminal 600 of the user may be paired with the vehicle 700 automatically or by execution of an application by the user.

A typical example of the location information module 714, which serves to acquire the location of the vehicle 700, is a global positioning system (GPS) module. For example, if the vehicle utilizes the GPS module, the location of the vehicle may be acquired using a signal from a GPS satellite.

The optical communication module 715 may include a light transmitter and a light receiver.

The light receiver may covert a light signal into an electrical signal to receive information. The light receiver may include a photodiode (PD) for receiving light. The PD is capable of converting light into an electrical signal. For example, the light receiver may receive information on a preceding vehicle through light emitted from a light source included in the foregoing vehicle.

The light transmitter may include at least one light emitting device for converting an electrical signal into a light signal. Preferably, the light emitting device is a light emitting diode (LED). The light transmitter converts an electrical signal into a light signal and transmits the light signal outside. For example, the light transmitter transmits a light signal by blinking a light emitting device at a predetermined frequency. According to some implementations, the light transmitter may include an array of a plurality of light emitting devices. According to some implementations, the light transmitter may be integrated with a lamp provided to the vehicle 700. For example, the light transmitter may be at least one of a headlight, a taillight, a stop lamp, a turn signal lamp and a sidelight. For example, the optical communication module 715 may exchange data with the vehicle 602 through optical communication.

The V2X communication module 716 serves to perform wireless communication with the server 601 or another vehicle 602. The V2X communication module 716 includes a module capable of implementing a vehicle-to-vehicle communication (V2V) protocol or a vehicle-to-infrastructure communication (V2I) protocol. The vehicle 700 may perform wireless communication with the external server 601 or the vehicle 602 through the V2X communication module 716.

The input unit 720 may include a driving manipulation means 721, a camera 195, a microphone 723 and a user input unit 724.

The driving manipulation means 721 receives user input for driving the vehicle 700. The driving manipulation means 721 may include a steering input means 721a, a shift input means 721b, an acceleration input means 721c, and a brake input means 721d.

The steering input means 721a receives a travel direction input of the vehicle 700 from the user. Preferably, the steering input means 721a is formed in the shape of a wheel to allow steering input through rotation. According to some implementations, the steering input means 721a may include a touchscreen, a touch pad, or a button.

The shift input means 721b receives, from the user, inputs for Park (P), Drive (D), Neutral (N) and Reverse (R) of the vehicle 700. Preferably, the shift input means 721b is formed in the shape of a lever. According to some implementations, the shift input means 721b may include a touchscreen, a touch pad, or a button.

The acceleration input means 721c receives an input for accelerating the vehicle 700 from the user. The brake input means 721d receives an input for decelerating the vehicle 700 from the user. Preferably, the acceleration input means 721c and the brake input means 721d are formed in the shape of a pedal. According to some implementations, the acceleration input means 721c or the brake input means 721d may include a touchscreen, a touch pad, or a button.

The camera 195 may include an image sensor and an image processing module. The camera 195 may process a still image or a moving image obtained by the image sensor (e.g., CMOS or CCD). The processing module may extract necessary information by processing the still image or moving image obtained through the image sensor, and transfer the extracted information to the controller 770. In some implementations, the vehicle 700 may include a camera 195 for capturing a vehicle front view image or a surroundings-of-vehicle image and an interior camera 195c for capturing images of the interior of the vehicle.

The interior camera 195c may acquire an image of passengers. The interior camera 195c may acquire an image for biometric recognition of the passengers.

The interior camera 195c may acquire an image of the passengers in the vehicle 700, thereby detecting the number of the passengers.

While FIG. 7 illustrates the camera 195 as being included in the input unit 720, the camera 195 may be a constituent included in the driver assistance apparatus 100 as described above with reference to FIGS. 2 to 6.

The microphone 723 may process an external sound signal to create electrical data. The data created through processing may be utilized for various purposes according to functions being executed by the vehicle 700. The microphone 723 may convert a voice command from the user into electrical data. The electrical data may be delivered to the controller 770.

According to an implementation, the camera 722 or microphone 723 may be a constituent included in the sensing unit 760 rather than in the input unit 720.

The user input unit 724 is intended to receive information input by the user. When information is input through the user input unit 724, the controller 770 may control operation of the vehicle 700 in accordance with the input information. The user input unit 724 may include a touch input means or a mechanical input means. According to some implementations, the user input unit 724 may be disposed in one area of the steering wheel. In this case, the driver may manipulate the user input unit 724 with fingers while holding the steering wheel.

The sensing unit 760 senses a signal related to traveling of the vehicle 700. To this end, the sensing unit 760 may include a collision sensor, a wheel sensor, a speed sensor, a tilt sensor, a weight sensor, a heading sensor, a yaw sensor, a gyro sensor, a position module, a vehicle drive/reverse sensor, a battery sensor, a fuel sensor, a tire sensor, a steering sensor based on turning of the steering wheel, a vehicle interior temperature sensor, a vehicle interior humidity sensor, a rain sensor, an ultrasonic sensor, radar, and lidar (Light Detection And Ranging).

Thereby, the sensing unit 760 may acquire sensing signals carrying vehicle collision information, vehicle direction information, vehicle location information (GPS information), vehicle orientation information, vehicle speed information, vehicle acceleration information, vehicle inclination information, vehicle drive/reverse information, battery information, fuel information, tire information, vehicle lamp information, vehicle interior temperature information, vehicle interior humidity information, information about whether it rains, and an angle by which the steering wheel is rotated.

The sensing unit 760 may further include an accelerator pedal sensor, a pressure sensor, an engine speed sensor, an air flow sensor (AFS), an intake air temperature sensor (ATS), a water temperature sensor (WTS), a throttle position sensor (TPS), a TDC sensor, and a crankshaft angle sensor (CAS).

The sensing unit 760 may include a biometric identification information sensing unit. The biometric identification information sensing unit senses and acquires biometric identification information of a passenger. The biometric identification information may include fingerprint information, iris scan information, retina scan information, hand geometry information, facial recognition information, and voice recognition information. The biometric identification information sensing unit may include a sensor for sensing biometric identification information of a person in the vehicle. Herein, the interior camera 195c and the microphone 723 may operate as sensors. The biometric recognition information sensing unit may acquire hand shape information and face recognition information through the interior camera 195c.

The output unit 740, which serves to output information processed by the controller 770, may include a display unit 741, a sound output unit 742 and a haptic output unit 743.

The display unit 741 may display information processed by the controller 770. For example, the display unit 741 may display vehicle-related information. Herein, the vehicle-related information may include vehicle control information for controlling the direction of the vehicle or vehicle driving assistance information for assisting the driver in driving the vehicle. The vehicle-related information may also include vehicle condition information indicating the current condition of the vehicle or vehicle driving information related to driving.

The display unit 741 may include at least one of a liquid crystal display (LCD), a thin film transistor-liquid crystal display (TFT LCD), an organic light-emitting diode (OLED) display, a flexible display, a 3D display and an e-ink display.

The display unit 741 may form a layered architecture together with a touch sensor or be integrated with the touch sensor, thereby implementing a touchscreen. Such touchscreen may function as the user input unit 724 providing an input interface between the vehicle 700 and the user and also as an output interface between the vehicle 700 and the user. In this case, the display unit 741 may include a touch sensor for sensing touch applied to the display unit 741 in order to receive a control command in a touch manner. Thereby, when the display unit 741 is touched, the touch sensor may sense the touch, and the controller 770 may generate a control command corresponding to the touch. Content input through touch may include characters, numbers, or menu items which can be indicated or specified in various modes.

In some implementations, the display unit 741 may include a cluster to allow the driver to check the vehicle condition information or vehicle driving information during driving. The cluster may be positioned on the dashboard. In this case, the driver can check the information displayed on the cluster while looking forward.

According to some implementations, the display unit 741 may be implemented as a head up display (HUD). If the display unit 741 is implemented as the HUD, information may be output through a transparent display provided to the windshield. Alternatively, the display unit 741 may be provided with a projection module, thereby outputting information through an image projected onto the windshield.

The sound output unit 742 converts an electrical signal from the controller 770 into an audio signal and outputs the audio signal. To this end, the sound output unit 742 may be provided with a speaker. The sound output unit 742 may output sound corresponding to operation of the user input unit 724.

The haptic output unit 743 generates haptic output. For example, the haptic output unit 743 may vibrate the steering wheel, a seat belt and a seat to allow the user to recognize the output.

The vehicle drive unit 750 may control operation of various vehicular devices. The vehicle drive unit 750 may receive a control signal from the driver assistance apparatus 100. The vehicle drive unit 750 may control various devices based on the control signal.

The vehicle drive unit 750 may include a power source drive unit 751, a steering drive unit 752, a brake drive unit 753, a lamp drive unit 754, an air conditioning drive unit 755, a window drive unit 756, an airbag drive unit 757, a sunroof drive unit 758 and a suspension drive unit 759.

The power source drive unit 751 may perform electronic control of the power source in the vehicle 700.

For example, if a fossil fuel-based engine is the power source, the power source drive unit 751 may perform electronic control of the engine. Thereby, the output torque of the engine may be controlled. If the power source drive unit 751 is an engine, the output torque of the engine may be controlled by the controller 770 to limit the speed of the vehicle.

As another example, if an electric motor is the power source, the power source drive unit 751 may control the motor. Thereby, the rotational speed and torque of the motor may be controlled.

The power source drive unit 751 may receive an acceleration control signal from the driver assistance apparatus 100. The power source drive unit 751 may control the power source according to the received acceleration control signal.

The steering drive unit 752 may perform electronic control of the steering apparatus in the vehicle 700. Thereby, the steering drive unit 752 may change the travel direction of the vehicle. The steering drive unit 752 may receive a steering control signal from the driver assistance apparatus 100. The steering drive unit 752 may control the steering apparatus to be steered according to the steering control signal.

The brake drive unit 753 may perform electronic control of a brake apparatus in the vehicle 700. For example, by controlling the operation of the brakes disposed on the wheels, the speed of the vehicle 700 may be reduced. In another example, the brake disposed on a left wheel may be operated differently from the brake disposed on a right wheel in order to adjust the travel direction of the vehicle 700 to the left or right. The brake drive unit 753 may receive a deceleration control signal from the driver assistance apparatus 100. The brake drive unit 753 may control the brake apparatus according to the received deceleration control signal.

The lamp drive unit 754 may control lamps disposed inside and outside the vehicle to be turned on/off. In addition, the lamp drive unit 754 may control the intensity and direction of light from the lamps. For example, the lamp drive unit 754 may control a turn signal lamp and a brake lamp.

The air conditioning drive unit 755 may perform electronic control of an air conditioner in the vehicle 700. For example, if the temperature of the interior of the vehicle is high, the air conditioning drive unit 755 may control the air conditioner to supply cool air to the interior of the vehicle.

The window drive unit 756 may perform electronic control of a window apparatus in the vehicle 700. For example, the window drive unit 756 may control opening or closing of the left and right windows on both sides of the vehicle.

The airbag drive unit 757 may perform electronic control of an airbag apparatus in the vehicle 700. For example, the unit may control the airbag apparatus such that the airbags are inflated when the vehicle is exposed to danger.

The sunroof drive unit 758 may perform electronic control of a sunroof apparatus in the vehicle 700. For example, the sunroof drive unit 758 may control opening or closing of the sunroof.

The suspension drive unit 759 may perform electronic control of a suspension apparatus in the vehicle 700. For example, when a road surface is uneven, the suspension drive unit 759 may control the suspension apparatus to attenuate vibration of the vehicle 700. The suspension drive unit 759 may receive a suspension control signal from the driver assistance apparatus 100. The suspension drive unit 759 may control the suspension apparatus according to the received suspension control signal.

The memory 730 is electrically connected to the controller 770. The memory 730 may store basic data for each unit, control data for controlling operation of each unit, and input/output data. When implemented through hardware, the memory 730 may include various storage devices such as a ROM, RAM, EPROM, flash drive, and hard drive. The memory 730 may store various kinds of data for overall operation of the vehicle 700 including a program for processing or controlling operation of the controller 770.

The interface unit 780 may serve as a path between the vehicle 700 and various kinds of external devices connected thereto. For example, the interface unit 780 may be provided with a port connectable to the mobile terminal 600, thus being connected to the mobile terminal 600 through the port. In this case, the interface unit 780 may exchange data with the mobile terminal 600.

The interface unit 780 may also serve as a path through which electrical energy is supplied to the mobile terminal 600 connected thereto. If the mobile terminal 600 is electrically connected to the interface unit 780, the interface unit 780 is controlled by the controller 770 to provide the mobile terminal 600 with electrical energy supplied from the power supply 790.

The controller 770 may control overall operations of the respective units in the vehicle 700. The controller 770 may be called an electronic control unit (ECU).

The controller 770 may be implemented as hardware using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units for performing other functions.

The power supply 790 may be controlled by the controller 770 to supply electric power necessary for operation of respective constituents. In particular, the power supply 790 may receive power from, for example, a battery in the vehicle.

The driver assistance apparatus 100 may exchange data with the controller 770. A control signal generated from the driver assistance apparatus 100 may be output to the controller 770. The driver assistance apparatus 100 may be the driver assistance apparatus described above with reference to FIGS. 1 to 6B.

The display apparatus 400 may exchange data with the controller 770. The controller 770 may receive navigation information from the display apparatus 400 or a separate navigation apparatus (not shown). Herein, the navigation information may include destination information, route information according to the destination, map information, or vehicle location information, wherein the map information and the vehicle location information are related to traveling of the vehicle.

Figure 8:
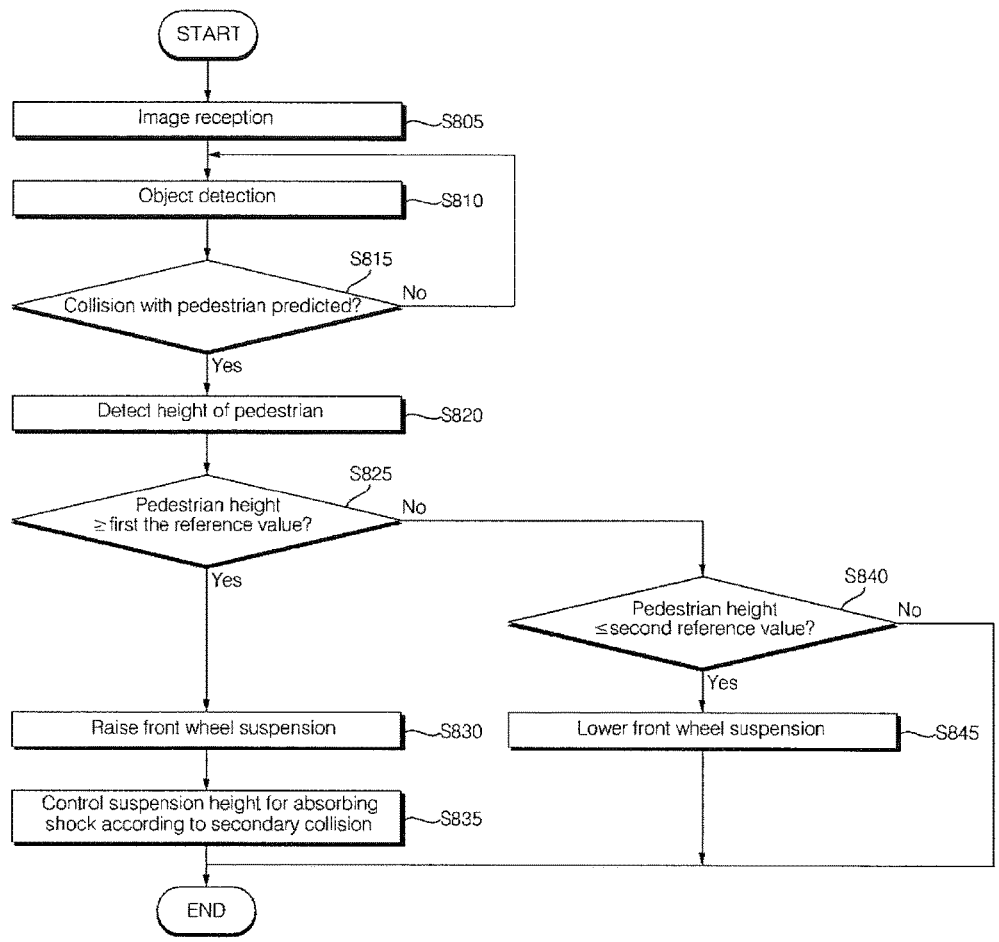
FIG. 8 is a flowchart illustrating an example of operations of a driver assistance apparatus according to a first implementation.

FIG. 8 is a flowchart illustrating a driver assistance apparatus according to some implementations.

Referring to FIG. 8, the processor 170 may receive an image acquired by the camera 195 (S805). Herein, the image may be a vehicle front view image or a surroundings-ofvehicle image. Herein, the camera 195 may include a mono camera, stereo cameras 195a and 195b or around view cameras 195d, 195e, 195f and 195g.

The processor 170 may detect an object in the received image (S810). The processor 170 may recognize the object detected by comparing the image with data stored in the memory 140. The processor 170 may track the recognized object. Herein, the object may be a pedestrian.

The processor 170 may calculate a distance to the detected object. For example, the processor 170 may calculate the distance to the object based on variation in the recognized size of the object over time. Alternatively, the processor 170 may calculate the distance to the object based on disparity. Alternatively, the processor 170 may calculate the distance to the object based on Time of Flight (TOF).

The processor 170 may calculate a relative speed of the object based on the detected distance. For example, the processor 170 may calculate the relative speed of the object by calculating the change in distance to the object per unit time.

The processor 170 may detect the speed of the object based on the travel speed of the driver's vehicle 700 and the relative speed The processor 170 may predict collision with a pedestrian (S815). The processor 170 may predict collision with a pedestrian based on the distance and relative speed of the pedestrian. For example, the processor 170 may calculate the time to collision (TTC) with the pedestrian. If the TTC is less than a reference value, the processor 170 may predict occurrence of collision. Herein, the collision may be the primary collision.

Thereafter, the processor 170 may detect the height of the pedestrian (S820). Herein, the height of the pedestrian may be the stature of the pedestrian.

The processor 170 may detect the actual height of an object based on the height of the pedestrian image and the distance to the pedestrian which are detected in the image.

For example, the processor 170 may detect an actual height of the object based on variation of the height of the pedestrian image and the distance to the pedestrian over time. For example, the processor 170 may detect the actual height of the object by comparing the height of the pedestrian image with the distance to the pedestrian. For example, the processor 170 may generate a depth map based on stereo images or a TOF image and detect the actual height of the object in the depth map.

While the processor 170 is illustrated in this implementation as performing prediction and determination of collision with a pedestrian (S815) after performing detection of the height of the pedestrian (S820), detection of the height of the pedestrian (S820) may be performed before prediction and determination of collision with the pedestrian (S815).

Once the height of the pedestrian is detected, the processor 170 may determine whether the height of the pedestrian is greater than or equal to a first reference value (S825).

If the height of the pedestrian is greater than or equal to the first reference value, the processor 170 may provide a height control signal for the front wheel suspensions.

For example, the processor 170 may provide a control signal for raising the front wheel suspensions (S830).

For example, the processor 170 may provide a control signal for raising the front wheel suspensions such that an initial contact is made between one area of the front bumper of the driver's vehicle 700 and knees of the pedestrian. In this case, the pedestrian's head may be positioned in one area of the hood of the driver's vehicle 700 when the secondary collision occurs.

When the vehicle is suddenly braked, nose dive may occur on the vehicle 700. In this case, the front end of the vehicle 700 is inclined downward and the rear end of the vehicle 700 is inclined upward.

If the driver's vehicle 700 collides with the pedestrian while nose dive occurs, initial contact with the pedestrian may be made on the part of the pedestrian below the knees of the pedestrian. In this case, the pedestrian's head may collide with the windshield or roof of the driver's vehicle 700 rather than with one area of the hood of the vehicle 700. Thereby, severe shock is likely to be applied to the pedestrian. Accordingly, by controlling the suspensions as in some implementations in order to adjust a portion of the pedestrian which will make an initial contact with the bumper of the driver's vehicle 700 when collision occurs, the pedestrian may be protected when the secondary collision occurs.

Thereafter, the processor 170 may provide a suspension height control signal for absorbing shock when the secondary collision occurs (S835).

For example, in order to absorb shock applied to the pedestrian when the secondary collision occurs, the processor 170 may provide a control signal for lowering suspensions at the time the pedestrian collides with the vehicle.

In some implementations, once the height of the pedestrian is detected, the processor 170 may determine whether the height of the pedestrian is less than or equal to a second reference value (S840).

If the height of the pedestrian is less than or equal to the second reference value, the processor 170 made provide a height control signal for the front wheel suspensions.

For example, the processor 170 may provide a control signal for lowering the front wheel suspensions (S845).

For example, the processor 170 may provide a control signal for lowering the front wheel suspensions such that an initial contact is made between one area of the front bumper of the driver's vehicle 700 and the knees of the pedestrian.

When the vehicle is suddenly braked, nose dive may occur on the vehicle 700. In this case, the front end of the vehicle 700 is inclined downward and the rear end of the vehicle 700 is inclined upward.

If the height of the pedestrian is less than or equal to the second reference value rather than being greater than or equal to the first reference value when collision between the driver's vehicle 700 and the pedestrian occurs, the driver's vehicle 700 may collide with the upper body of the pedestrian even if the nose dive occurs. In this case, internal organs of the pedestrian may be damaged. Accordingly, by controlling the front wheel suspensions to be lowered, damage to the pedestrian may be minimized. In addition, by controlling the suspensions, the pedestrian may be protected in the manner that the pedestrian's head is positioned in one area of the hood of the driver's vehicle 700 when the secondary collision occurs.

Thereafter, the processor 170 may provide a suspension height control signal for absorbing shock when the secondary collision occurs (S835).

For example, in order to absorb shock applied to the pedestrian when the secondary collision occurs, the processor 170 may provide a control signal for lowering suspensions at the time the pedestrian collides with the vehicle.

The first reference value and the second reference value may be reference values for positioning the pedestrian's head in one area of the hood of the driver's vehicle 700 when the secondary collision occurs after the primary collision between the front bumper of the vehicle 700 and the pedestrian. Herein, one area of the hood may be an area in which a pedestrian airbag inflates when collision with a pedestrian occurs. Alternatively, the one area of the hood may be a part of the hood that pops up when collision with a pedestrian occurs.

For example, the first reference value and the second reference value may be reference values for causing a part of the front bumper of the vehicle 700 to make an initial contact with the knees of the pedestrian when primary collision with the pedestrian occurs. The reference value may be determined based on the height of an adult. The second reference value may be determined based on the height of a child.

Figure 9:
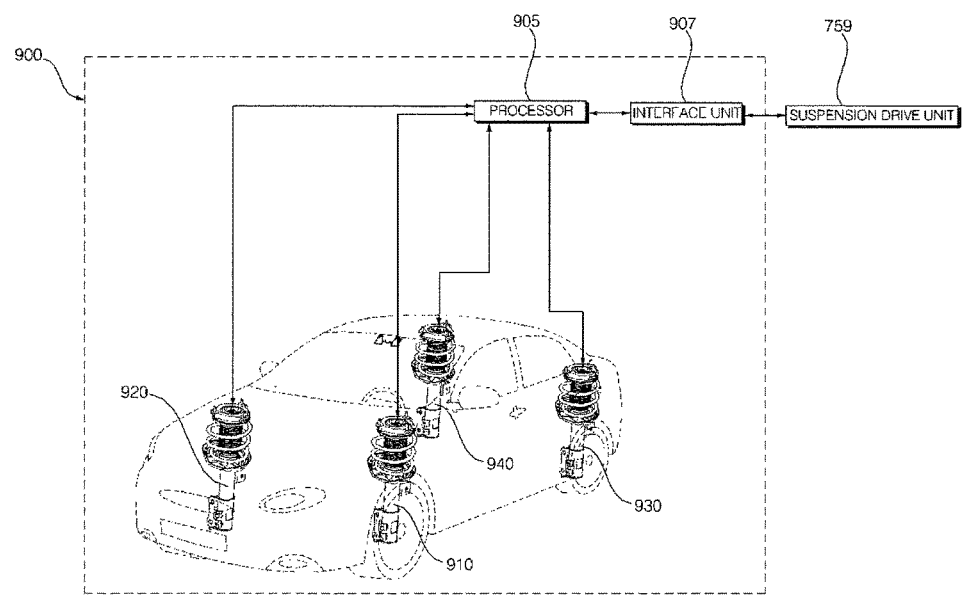
FIG. 9 is a diagram illustrating an example of a suspension apparatus operating in conjunction with a driver assistance apparatus.

FIG. 9 is a view illustrating a suspension apparatus according to some implementations.

Referring to FIG. 9, a suspension apparatus 900 may include a first suspension 910 connected to the left front wheel, a second suspension 920 connected to the right front wheel, a third suspension 930 connected to the left rear wheel and a fourth suspension 940 connected to the right rear wheel.

Each of the suspensions 910, 920, 930 and 940 may include a spring, a shock absorber and a stabilizer.

Each of the suspensions 910, 920, 930 and 940 may be controlled by a processor 905. The processor 905 may be controlled by the suspension drive unit 759.

The suspension apparatus may include an interface unit 907. The interface unit 907 may receive, from the driver assistance apparatus, a suspension height control signal for adjusting a portion of the driver's vehicle which is expected to be shocked according to collision between the driver's vehicle and an object detected in a vehicle front view image or surroundings-of-vehicle image.

The processor 905 may control the height of each of the suspensions 910, 920, 930 and 940 according to the received control signal.

The first suspension 910 and the second suspension 920 may be referred to as front wheel suspensions.

The third suspension 930 and the fourth suspension 940 may be referred to as rear wheel suspensions.

The first suspension 910 and the third suspension 930 may be referred to as left wheel suspensions.

The second suspension 920 and the fourth suspension 940 may be referred to as right wheel suspensions.

Figure 10:
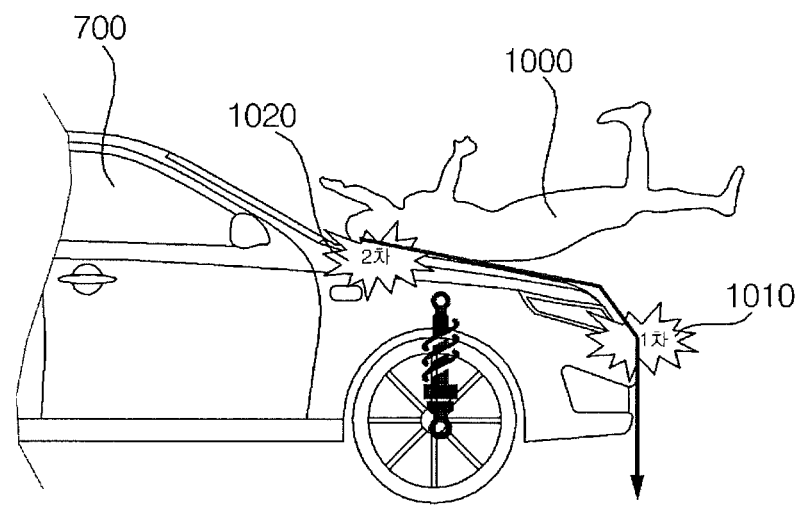
FIG. 10 illustrates an example of a collision between a pedestrian and a vehicle including a driver assistance apparatus.

FIG. 10 illustrates a situation of collision between a vehicle and a pedestrian according to some implementations.

Referring to FIG. 10, the vehicle 700 may collide with a pedestrian 1000. Herein, the pedestrian 1000 may be positioned in front of the vehicle.

The collision may include a primary collision 1010 and a secondary collision 1020. The primary collision 1010 may occur as the pedestrian 1000 is hit by a part of the bumper of the vehicle 700. The secondary collision may occur as the pedestrian 1000 lifted in the air after the primary collision is hit by the hood, windshield or roof of the vehicle 700.

When the vehicle is suddenly braked, a nose dive phenomenon occurs. In this case, the front end of the vehicle 700 is inclined downward and the rear end of the vehicle 700 is inclined upward.

In this case, when the primary collision occurs, the pedestrian may not be hit by an expected impacted portion of the bumper which is properly designed in preparation of collision with the pedestrian.

Accordingly, when the nose dive occurs and the pedestrian collides with the vehicle, it is necessary to protect the pedestrian by properly controlling the suspensions.

Figure 11:
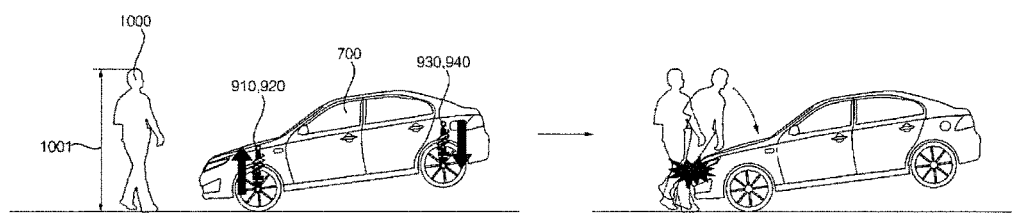
FIGS. 11 and 12 illustrate examples of operations of a driver assistance apparatus performed when collision with a pedestrian occurs.
Figure 12:
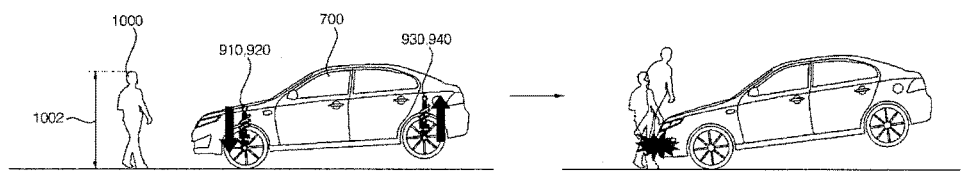

FIGS. 11 and 12 illustrate operation of a driver assistance apparatus performed when collision with a pedestrian occurs according to some implementations.

FIG. 11 illustrates collision between a vehicle and an adult pedestrian. FIG. 12 illustrates collision between a vehicle and a child.

Referring to FIGS. 11 and 12, the processor 170 may detect the pedestrian 1000 in a vehicle front view image or surroundings-of-vehicle image. The processor 170 may verify and track the pedestrian 1000.

The processor 170 may detect the distance and relative speed to the pedestrian 1000. For example, the processor 170 may track the pedestrian 1000 in the images, thereby converting variation in the size of the pedestrian 1000 over time into the distance between the driver's vehicle 700 and the pedestrian 1000. For example, the processor 170 may calculate the distance between the driver's vehicle 700 and the pedestrian 1000 based on a disparity difference corresponding to the pedestrian 1000 in stereo images. For example, the processor 170 may calculate the distance between the driver's vehicle 700 and the pedestrian 1000 based on the calculated TOF of the pedestrian 1000.

The processor 170 may calculate a relative speed of the pedestrian 1000 by calculating the change in distance to the pedestrian 1000 per unit time.

The processor 170 may predict collision between the driver's vehicle 700 and the pedestrian 1000 detected in an image. For example, the processor 170 may predict collision with the pedestrian 1000 positioned in front of the vehicle 700 based on the distance and relative speed of the pedestrian 1000. For example, the processor 170 may calculate the time to collision (TTC) with the pedestrian 1000 positioned in front of the vehicle 700. If the TTC is less than or equal to a reference value, the processor 170 may predict occurrence of collision. Herein, the collision may be the primary collision.

When the vehicle is suddenly braked with collision with the pedestrian 1000 predicted, the processor 170 may provide a height control signal for the front wheel suspensions 910 and 920.

When the vehicle is suddenly braked, nose dive occurs. In this case, the front end of the vehicle 700 is inclined downward and the rear end of the vehicle 700 is inclined upward.

In this case, the pedestrian 1000 may not collide with an expected impacted portion of the bumper which is properly designed in preparation of collision with the pedestrian 1000. In addition, if the driver's vehicle 700 collides with the pedestrian 1000 while nose dive occurs, initial contact with the pedestrian 1000 may be made on the part of the pedestrian 1000 below the knees of the pedestrian 1000. In this case, the head of the pedestrian 1000 may collide with the windshield or roof of the driver's vehicle 700 rather than with one area of the hood of the vehicle 700. Thereby, severe shock is likely to be applied to the pedestrian 1000. Accordingly, by providing a height control signal for the front wheel suspensions 910 and 920 when the vehicle is suddenly braked with collision predicted as in this implementation, the pedestrian 1000 may be protected.

In some implementations, the height control signal for the front wheel suspensions 910 and 920 may be provided to the suspension drive unit 759. The suspension drive unit 759 may control the suspension apparatus through the processor 905 according to the provided control signal.

In some implementations, the processor 170 may provide a height control signal for the front wheel suspensions 910 and 920 based on the height of the pedestrian detected in a vehicle front view image or surroundings-of-vehicle image.

The processor 170 may detect the height 1001, 1002 of a pedestrian. Herein, the height 1001, 1002 of the pedestrian may be the stature of the pedestrian.

The processor 170 may detect the actual height of an object based on the height of the pedestrian image and the distance to the pedestrian which are detected in the image.

As shown in FIG. 11, the processor 170 may determine whether the height 1001 of the pedestrian 1000 is greater than or equal to a first reference value. If the height 1001 of the pedestrian 1000 is greater than or equal to the first reference value, the processor 170 may provide a control signal for raising the front wheel suspensions 910 and 920. Alternatively, the processor 170 may provide a control signal for lowering the rear wheel suspensions 930 and 940.

For example, the processor 170 may provide a control signal for raising the front wheel suspensions 910 and 920 such that an initial contact is made between one area of the front bumper of the driver's vehicle 700 and the knees of the pedestrian 1000.

For example, the processor 170 may provide a control signal for lowering the rear wheel suspensions 930 and 940 such that an initial contact is made between one area of the front bumper of the driver's vehicle 700 and the knees of the pedestrian 1000.

In this case, the head of the pedestrian 1000 may be positioned in one area of the hood of the driver's vehicle 700 when the secondary collision occurs.

When the vehicle is suddenly braked, nose dive may occur on the vehicle 700. In this case, the front end of the vehicle 700 is inclined downward and the rear end of the vehicle 700 is inclined upward.

If the driver's vehicle 700 collides with the pedestrian 1000 while nose dive occurs, initial contact with the pedestrian 1000 may be made on the part of the pedestrian below the knees of the pedestrian 1000. In this case, the head of the pedestrian 1000 may collide with the windshield or roof of the driver's vehicle 700 rather than with one area of the hood of the vehicle 700. Thereby, severe shock is likely to be applied to the pedestrian 1000. Accordingly, by controlling the suspensions 910, 920, 930 and 940 as in some implementations in order to adjust a portion of the pedestrian 1000 which will make an initial contact with the bumper of the driver's vehicle 700 when collision occurs, the pedestrian 1000 may be protected when the secondary collision occurs.

As shown in FIG. 12, the processor 170 may determine whether the height 1002 of the pedestrian 1000 is less than or equal to a second reference value. If the height 1002 of the pedestrian 1000 is less than or equal to the second reference value, the processor 170 may provide a control signal for lowering the front wheel suspensions 910 and 920. Alternatively, the processor 170 may provide a control signal for raising the rear wheel suspensions 930 and 940.

For example, the processor 170 may provide a control signal for lowering the front wheel suspensions 910 and 920 such that an initial contact is made between one area of the front bumper of the driver's vehicle 700 and the knees of the pedestrian 1000.

For example, the processor 170 may provide a control signal for raising the rear wheel suspensions 930 and 940 such that an initial contact is made between one area of the front bumper of the driver's vehicle 700 and the knees of the pedestrian 1000.

In this case, the head of the pedestrian 1000 may be positioned in one area of the hood of the driver's vehicle 700 when the secondary collision occurs.

When the vehicle is suddenly braked, nose dive may occur on the vehicle 700. In this case, the front end of the vehicle 700 is inclined downward and the rear end of the vehicle 700 is inclined upward.

If the height of the pedestrian 1000 is less than or equal to the second reference value rather than being greater than or equal to the first reference value when collision between the driver's vehicle 700 and the pedestrian 1000 occurs, the driver's vehicle 700 may collide with the upper body of the pedestrian 1000 even if the nose dive occurs. In this case, internal organs of the pedestrian 1000 may be damaged. Accordingly, by controlling the front wheel suspensions to be lowered, damage to the pedestrian 1000 may be minimized. In addition, by controlling the suspensions, the pedestrian may be protected in the manner that the head of the pedestrian 1000 is positioned in one area of the hood of the driver's vehicle 700 when the secondary collision occurs.

The first reference value and the second reference value may be reference values for positioning the head of the pedestrian 1000 in one area of the hood of the driver's vehicle 700 when the secondary collision course after the primary collision between the front bumper of the vehicle 700 and the pedestrian 1000. Herein, one area of the hood may be an area in which a pedestrian airbag inflates when collision with the pedestrian 1000 occurs. Alternatively, the one area of the hood may be a part of the hood that pops up when collision with the pedestrian 1000 occurs.

For example, the first reference value and the second reference value may be reference values for causing a part of the front bumper of the vehicle 700 to make an initial contact with the knees of the pedestrian 1000 when primary collision with the pedestrian occurs. The reference value may be determined based on the height of an adult. The second reference value may be determined based on the height of a child.

Figure 13:
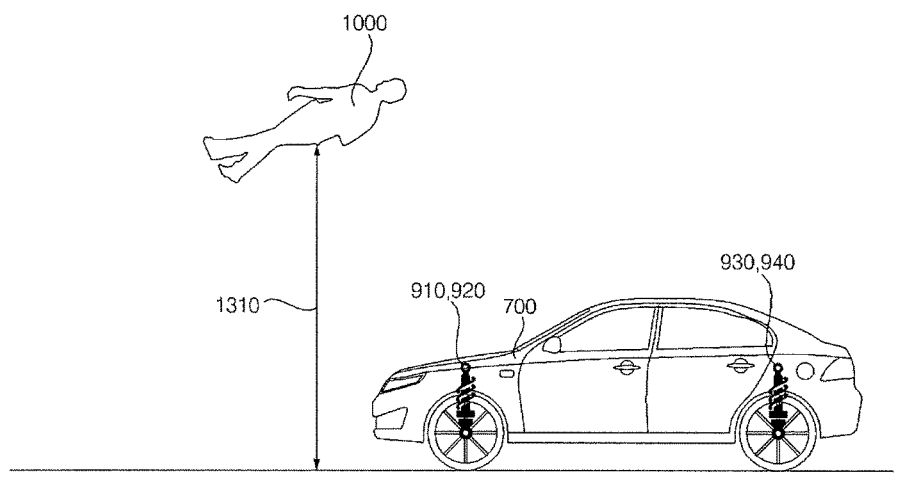
FIGS. 13 to 15 illustrate examples of operations of a driver assistance apparatus performed in preparation for a secondary collision with a pedestrian according to some implementations.
Figure 14:
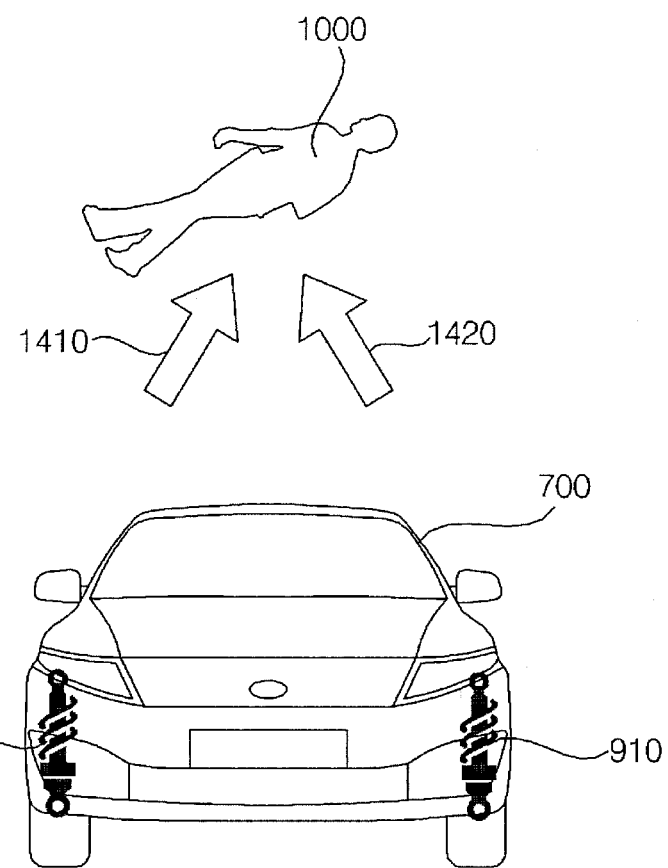
Figure 15:
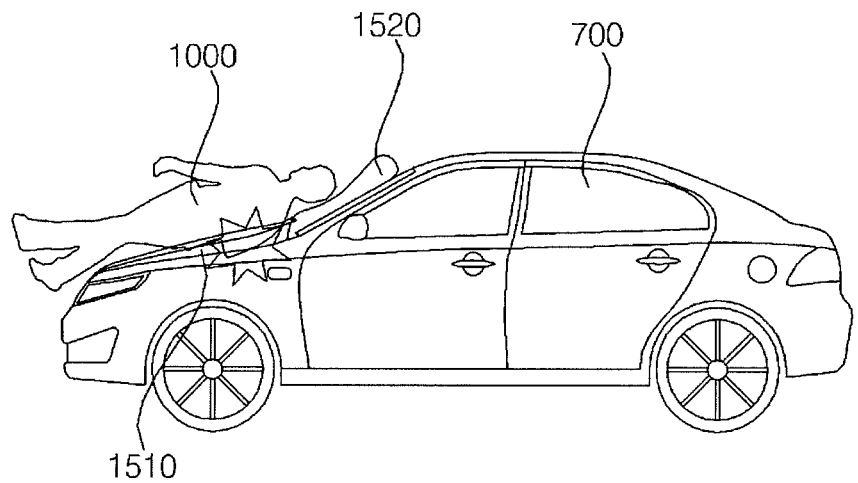

FIGS. 13 to 15 illustrate operation of a driver assistance apparatus performed in preparation of secondary collision with a pedestrian according to some implementations.

Referring to FIGS. 13 to 15, the processor 170 may provide a height control signal for the suspensions 910, 920, 930 and 940 such that the pedestrian's head is positioned in one area of the hood of the driver's vehicle 700 when the secondary collision occurs after the primary collision.

Herein, the one area of the hood may be an area in which a pedestrian airbag 1520 inflates when collision with the pedestrian 1000 occurs. Alternatively, the one area of the hood may be an area 1510 in which the hood pops up when collision with the pedestrian 1000 occurs.

The hood of the vehicle 700 is designed to absorb shock in preparation of a secondary collision with the pedestrian 1000. In addition, the vehicle 700 may include a hood pop-up apparatus to absorb shock applied to the pedestrian 1000 by popping up when collision with the pedestrian 1000 occurs. The vehicle 700 may include a pedestrian protection airbag 1520. If the head of the pedestrian 1000 is positioned in one area of the hood when a secondary collision occurs after the primary collision with the pedestrian 1000, shock applied to the pedestrian 1000 may be minimized.

After the primary collision with the pedestrian 1000 occurs, the processor 170 may provide a height control signal for the suspensions 910, 920, 930 and 940 to absorb shock according to the secondary collision with the pedestrian 1000.

When the secondary collision occurs after the primary collision with the pedestrian 1000, the processor 170 may provide a control signal for lowering the front wheel suspensions 910 and 920. By lowering the front wheel suspensions 910 and 920, the vehicle 700 may absorb shock in a direction in which the pedestrian 1000 falls. In this case, the vehicle 700 and may absorb shock applied to the pedestrian 1000 when the secondary collision occurs.

As shown in FIG. 13, after the primary collision with the pedestrian 1000 occurs, the processor 170 may detect a height 1310 to which the pedestrian 1000 is lifted in a vehicle front view image or surroundings-of-vehicle image. The processor 170 may provide a control signal for lowering the front wheel suspensions 910 and 920 based on the detected lift height 1310 of the pedestrian 1000 when the secondary collision occurs. For example, the processor 170 may determine time to lower the front wheel suspensions based on the lift height 1310 of the pedestrian 1000. For example, the processor 170 may determine the degree by which the front wheel suspensions 910 and 920 are to be lowered, based on the lift height 1310 of the pedestrian 1000.

In some implementations, as shown in FIG. 14, after the primary collision with the pedestrian 1000 occurs, the processor 170 may detect a direction 1410, 1420 in which the pedestrian 1000 is lifted in a vehicle front view image or surroundings-of-vehicle image. Based on the detected direction 1410, 1420 in which the pedestrian 1000 is lifted, the processor 170 may provide a control signal such that the height of the front left wheel suspension 910 becomes different from that of the front right wheel suspension 920 when the secondary collision occurs.

For example, if the lift direction of the pedestrian 1000 is directed to the left with respect to the forward travel direction of the vehicle 700, the processor 170 may provide a control signal such that the front left wheel suspension 910 is lowered compared to the front right wheel suspension 920.

For example, if the lift direction of the pedestrian 1000 is directed to the right with respect to the forward travel direction of the vehicle 700, the processor 170 may provide a control signal such that the front right wheel suspension 920 is lowered compared to the front left wheel suspension 910.

By controlling the heights of the front left wheel suspension 910 and the front right wheel suspension 920 differently according to the lift direction of the pedestrian 1000 as above, shock applied to the pedestrian 1000 may be further reduced.

In some implementations, as shown in FIG. 15, the processor 170 may provide a control signal such that the hood of the vehicle 700 pops up 1510 when the secondary collision occurs after the primary collision with the pedestrian 1000.

By causing the hood to pop up, the vehicle 700 may absorb shock applied to the pedestrian when the secondary collision occurs.

In some implementations, after the primary collision with the pedestrian 1000 occurs, the processor 170 may detect a lift height 1310 (see, e.g., FIG. 13) of the pedestrian 1000 in a vehicle front view image or surroundings-of-vehicle image. The processor 170 may provide a control signal based on the detected lift height 1310 (see, e.g., FIG. 13) of the pedestrian 1000 such that the hood of the vehicle 700 pops up 1510 when the secondary collision occurs. For example, the processor 170 may determine the time for the hood to pop up 1510 based on the lift height 1310 (see, e.g., FIG. 13) of the pedestrian 1000. For example, the processor 170 may determine the degree by which the pops up 1510 based on the lift height 1310 (see, e.g., FIG. 13) of the pedestrian 1000.

The hood of the vehicle 700 may be popped up 1510 by operation of a first actuator disposed on the left side of the driver's vehicle 700 and a second actuator disposed on the right side of the driver's vehicle 700. Herein, the first and second actuators may be hydraulic or electric actuators. The first and second actuators may be operated according to a control signal provided from the processor 170.

After the primary collision with the pedestrian 1000 occurs, the processor 170 may detect the direction 1410, 4020 (see, e.g., FIG. 14) in which the pedestrian 1000 is lifted in a vehicle front view image or a surroundings-of-vehicle image. The processor 170 may provide a control signal based on the detected lift direction 1410, 4020 (see, e.g., FIG. 14) of the pedestrian 1000 such that the degree of operation of the first actuator is different from the degree of operation of the second actuator when the secondary collision occurs.

For example, if the lift direction 1410 of the pedestrian 1000 is directed to the left with respect to the forward travel direction of the vehicle 700, the processor 170 may provide a control signal such that the operational displacement of the first actuator is larger than that of the second actuator. In this case, the left portion of the hood may be raised higher than the right portion of the hood.

For example, if the lift direction 1420 of the pedestrian 1000 is directed to the right with respect to the forward travel direction of the vehicle 700, the processor 170 may provide a control signal such that the operational displacement of the second actuator is larger than that of the first actuator. In this case, the right portion of the hood may be raised higher than the left portion of the hood.

By controlling the degrees of operations of the first actuator and the second actuator differently, the lift direction of the object, shock applied to the object may be further reduced.

Figure 16:
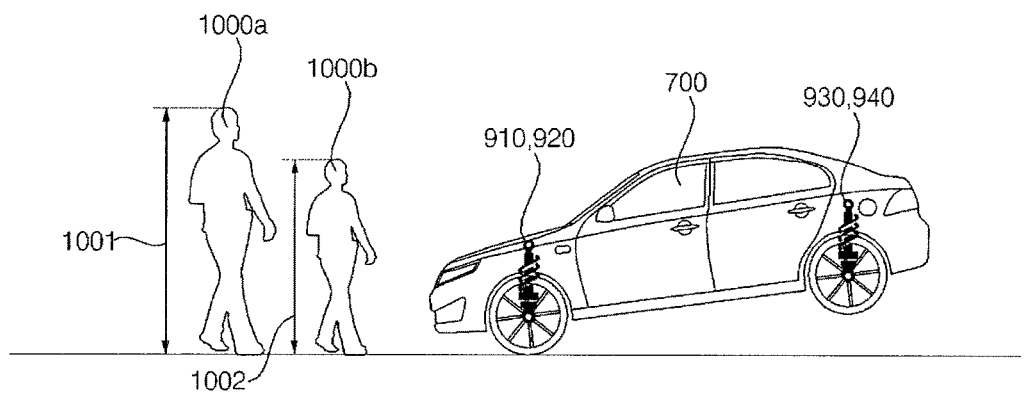
FIG. 16 illustrates an example of an operation of a driver assistance apparatus when a plurality of pedestrians is detected.

FIG. 16 illustrates operation of a driver assistance apparatus performed when a plurality of pedestrians is detected.

Referring to FIG. 16, the processor 170 may detect a plurality of pedestrians 1000a and 1000b in a vehicle front view image or surroundings-of-vehicle image. The processor 170 may verify and track the pedestrian 1000.

The processor 170 may predict collision between the driver's vehicle 700 and the plurality of pedestrians 1000a and 1000b detected in the image.

The processor 170 may detect heights 1001 and 1002 of the pedestrians. Herein, the height 1001 and 1002 of the pedestrians may be the statures of the pedestrians.

The height 1001 of a first pedestrian 1000a may be greater than or equal to a first the reference value and the height 1002 of a second pedestrian 1000b may be less than or equal to a second reference value.

In this case, the processor 170 may provide a height control signal for the suspensions 910, 920, 930 and 940 based on the height 1002 of the second pedestrian 1000b.

If the height of the suspensions 910, 920, 930 and 940 are controlled based on the height 1001 of the first pedestrian 1000a, a serious accident may happen as the second pedestrian 1000b is run over by the vehicle 700. Accordingly, controlling the heights of the suspensions 910, 920, 930 and 940 based on the height 1002 of the pedestrian 1000b is proper for protecting both the first pedestrian 1000a and the second pedestrian 1000b.

Figure 17:
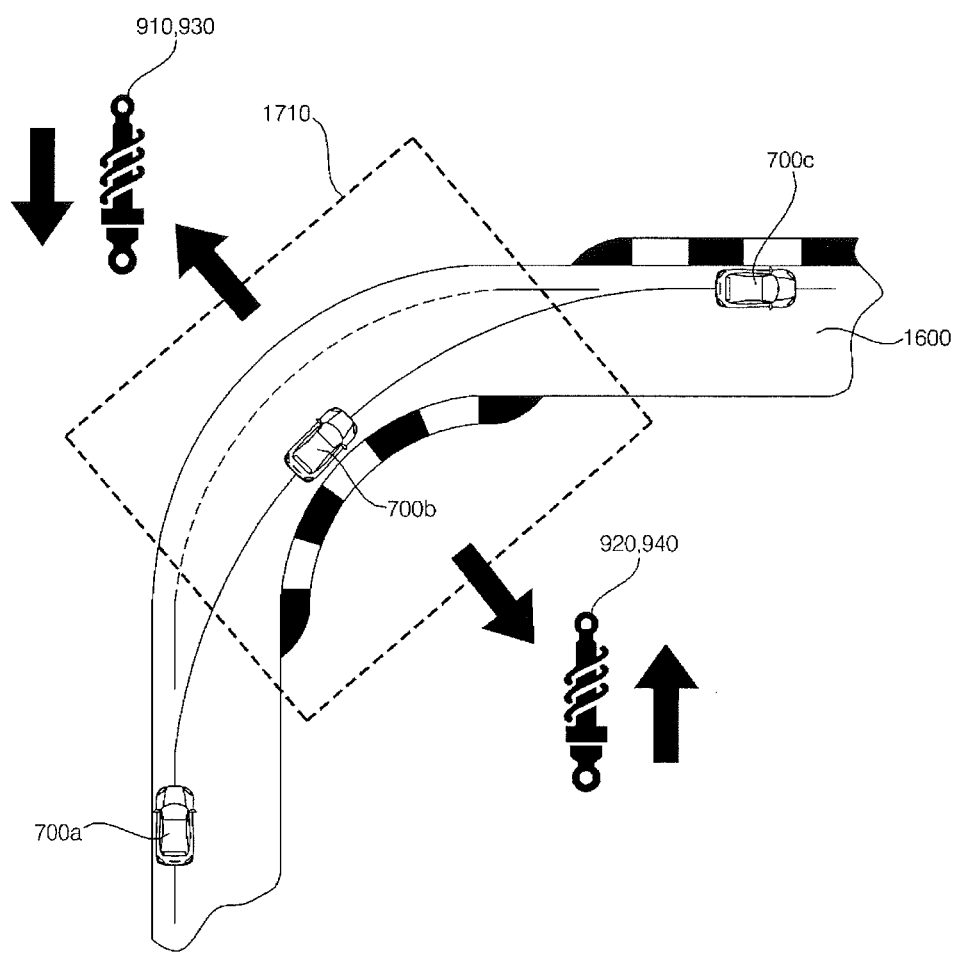
FIG. 17 is a diagram illustrating an example of an operation of a driver assistance apparatus when a vehicle travels along a curve.

FIG. 17 is a view illustrating operation of a driver assistance apparatus performed when the vehicle travels along a curve according to some implementations.

Hereinafter, description will be given with reference to FIG. 17 on the assumption that the road is curved rightward with respect to the forward direction of the vehicle. However, implementations also cover a case where the road is curved leftward with respect to the forward direction of the vehicle and other suspensions are controlled.

Referring to FIG. 17, the processor 170 may detect a curve 1710 to the right with respect to the forward direction of the vehicle in a vehicle front view image. According to an implementation, the processor 170 may acquire information on the curve position in front of the vehicle from the navigation information.

The processor 170 may control the height of the left wheel suspensions or right wheel suspensions in response to the detected curve.

For example, the processor 170 may provide a control signal for raising the right wheel suspensions 920 and 940 in response to the detected curve. In addition, the processor 170 may provide a control signal for lowering the left wheel suspensions 910 and 930 in response to the detected curve.

By controlling the suspensions as above, understeer and oversteer may be prevented and a convenient ride may be provided to the user.

In some implementations, the processor 170 may receive travel speed information about the vehicle 700 from the sensing unit 760 through the interface unit 130. The processor 170 may provide a height control signal for the left wheel suspensions or right wheel suspensions in response to the curvature of the detected curve and the entrance speed on the curve.

For example, the processor 170 may adjust the control speed for raising or lowering the left wheel suspensions or right wheel suspensions based on the entrance speed. For example, the processor 170 may determine the control speed in proportion to the entrance speed. If the entrance speed is high, the processor 170 may provide a control signal such that the left wheel suspensions or right wheel suspensions are quickly raised or lowered. On the other hand, if the entrance speed is slow, the processor 170 may provide a control signal such that the left wheel suspensions or right wheel suspensions are slowly raised or lowered.

Figure 18:
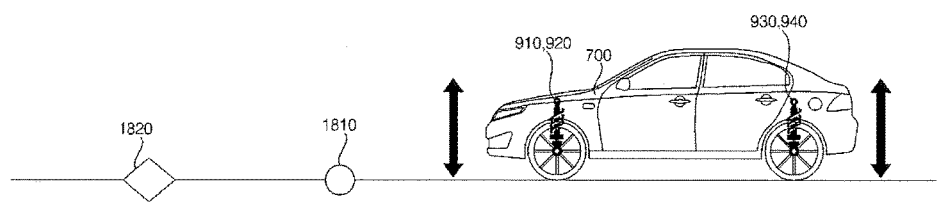
FIG. 18 is a diagram illustrating an example of an operation of a driver assistance apparatus depending on a condition of a road surface.

FIG. 18 is a view illustrating operation of a driver assistance apparatus depending on the condition of a road surface according to some implementations.

Referring to FIG. 18, the processor 170 may detect a road surface in a vehicle front view image or surroundings-of-vehicle image. The processor 170 may generate road surface condition information by analyzing the detected road surface. The processor 170 may provide a height control signal for the suspensions based on the road surface condition information.

For example, the processor 170 may detect the uneven portions 1810 and 1820 of the road surface in a vehicle front view image or surroundings-of-vehicle image. Herein, the bumps 1810 and 1820 may include obstacles (e.g. gravel, stone, rock, a load having fallen from another vehicle, etc.) protruding up from the road surface or potholes and sinkholes in the road surface.

The processor 170 may provide a height control signal for the suspension of a wheel passing over an uneven portion based on the detected uneven portions of the road surface. The suspensions 910, 920, 930 and 940 may be individually controlled. According, by controlling the suspensions of the wheels at the moment the wheels pass over an uneven portion, convenient ride may be provided to the user.

Figure 19:
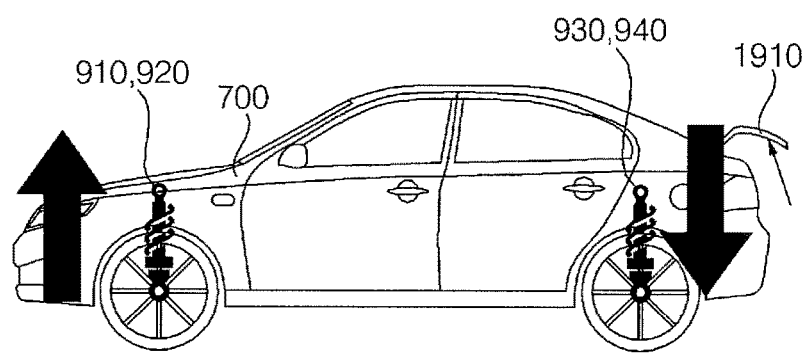
FIG. 19 is a diagram illustrating an example of an operation of a driver assistance apparatus when a trunk of a vehicle is open.

FIG. 19 is a view illustrating operation of a driver assistance apparatus performed when the trunk is open according to some implementations.

Referring to FIG. 19, the processor 170 may receive trunk opening information from the controller 770 or the sensing unit 760 through the interface unit 130.

For example, when an input for opening the trunk is received from the user through the user input unit 724, the processor 170 may receive the input from the user input unit 724 or the controller 770 through the interface unit 130.

For example, if a trunk opening sensor is included in the sensing unit 760, the processor 170 may receive the trunk opening information from the sensing unit 760.

When the trunk is opened, the processor 170 may provide a control signal for lowering the rear wheel suspensions.

By lowering the rear wheel suspensions when the trunk is opened, the user may easily take objects out of the trunk.

As is apparent from the above description, implementations may have one or more of the following effects.

First, when collision with an object is expected, collision with an expected impacted portion of the object to minimize damages may be induced.

Second, when the secondary collision occurs after collision with a pedestrian occurs, impacted may be minimized.

Third, both hood lift-up and a pedestrian protection airbag may be utilized to minimize damage to pedestrians when collision occurs.

Fourth, suspensions may be controlled to be suitable for a detected pedestrian with respect to the height of the pedestrian, thereby providing appropriate protection even for a small child.

Effects of implementations described herein are not limited to the aforementioned effects.

The implementations described above may be implemented as computer-readable code on a medium on which a program is recorded. The computer-readable medium includes all kinds of recording devices in which data readable by a computer system can be stored. Examples of the computer-readable medium include a hard disk drive (HDD), solid state disk (SSD), silicon disk drive (SDD), ROM, RAM, CD-ROM, magnetic tape, floppy disk, and optical data storage. Alternatively, implementations may be implemented in the form of a carrier wave (e.g., transmission over the Internet). In addition, the computer may include the processor 170 or the controller 770. The implementations above have been disclosed only for illustrative purposes, and various modifications, additions and substitutions may be implemented.

What is claimed is:

1. A driver assistance apparatus comprising:
   an object detection sensor configured to acquire data in a driving direction of a vehicle or around the vehicle; and
   at least one processor configured to:
      detect an object based on the acquired data;
      determine, based on the acquired data, a portion of the detected object that is expected to be impacted by the vehicle; and
      provide, based on the determined portion of the detected object that is expected to be impacted by the vehicle, a height control signal that controls a suspension of the vehicle to adjust a height of at least a portion of the vehicle,
   wherein the object detection sensor includes at least one camera,
   wherein the at least one processor is configured to:
      detect, based on the acquired data, that the object is a pedestrian;
      determine that the detected pedestrian is expected to be impacted by the vehicle in a primary collision and in a secondary collision after the primary collision; and provide, based on the determination that that the detected pedestrian is expected to be impacted by the vehicle in the primary collision and in the secondary collision after the primary collision, the height control signal that controls the suspension of the vehicle such that the suspension of the vehicle absorbs a shock of the secondary collision with the pedestrian, wherein the at least one processor is further configured to:
detect a height to which the pedestrian is lifted in a vehicle front view image from the camera; and
determine a time to lower the front wheel suspensions based on the lift height of the pedestrian, wherein the primary collision is a collision between the pedestrian and a part of the bumper of the vehicle, and wherein the secondary collision is a collision between the pedestrian and a hood, windshield, or roof of the vehicle.

2. The driver assistance apparatus according to claim 1, wherein the at least one processor is configured to:
determine that the pedestrian is expected to be impacted by the vehicle in a primary collision;
determine that, in a secondary collision after the primary collision, the head of the pedestrian is expected to be impacted by the hood of the vehicle; and
provide, based on the determination that the head of the pedestrian is expected to be impacted by the hood of the vehicle in the secondary collision, the height control signal that controls the suspension such that a first area of the hood of the vehicle is positioned to impact the head of the pedestrian in the secondary collision.

3. The driver assistance apparatus according to claim 2, wherein the at least one processor is configured to:
detect that the vehicle performs a braking operation related to the primary collision in which the pedestrian is expected to be impacted by the vehicle; and
provide the height control signal to control a front wheel suspension of the vehicle.

4. The driver assistance apparatus according to claim 2, wherein the at least one processor is configured to provide the height control signal that controls the suspension such that the first area of the hood of the vehicle is positioned to impact the head of the pedestrian in the secondary collision by:
determining a portion of the hood through which a pedestrian airbag is configured to inflate; and
setting the first area of the hood to be the portion of the hood through which the pedestrian airbag is configured to inflate.

5. The driver assistance apparatus according to claim 2, wherein the at least one processor is further configured to:
detect, based on the data acquired in the driving direction of the vehicle or around the vehicle, a height of the pedestrian; and
provide the height control signal to control the suspension of the vehicle based on the detected height of the pedestrian.

6. The driver assistance apparatus according to claim 5, wherein the at least one processor is further configured to:
determine that the detected height of the pedestrian is greater than or equal to a first reference value; and
provide, based on the determination that the detected height of the pedestrian is greater than or equal to a first reference value, the height control signal to control a front wheel suspension of the vehicle.

7. The driver assistance apparatus according to claim 6, wherein the at least one processor is further configured to provide, based on the determination that the detected height of the pedestrian is greater than or equal to the first reference value, the height control signal to control the front wheel suspension of the vehicle by:
providing the height control signal to control the front wheel suspension of the vehicle such that a portion of a front bumper of the vehicle is expected to make an initial contact with the pedestrian at a portion of the pedestrian corresponding to a location of at least one knee of the pedestrian.

8. The driver assistance apparatus according to claim 5, wherein the at least one processor is configured to provide the height control signal to control the suspension of the vehicle based on the detected height of the pedestrian by:
determining that the height of the pedestrian is less than or equal to a second reference value; and
providing the height control signal to lower a front wheel suspension of the vehicle.

9. The driver assistance apparatus according to claim 1, wherein the at least one processor is configured to provide the height control signal that controls the suspension of the vehicle such that the suspension of the vehicle absorbs the shock of the secondary collision with the pedestrian by:
providing the height control signal such that a front wheel suspension of the vehicle is lowered during the secondary collision with the pedestrian.

10. The driver assistance apparatus according to claim 9, wherein providing the height control signal such that the front wheel suspension of the vehicle is lowered during the secondary collision with the pedestrian comprises:
determining a lift direction of the detected pedestrian after the primary collision with the pedestrian; and
providing the height control signal based on the determined lift direction of the detected pedestrian after the primary collision with the pedestrian such that a height of a left wheel suspension of the vehicle differs from a height of a right wheel suspension of the vehicle.

11. The driver assistance apparatus according to claim 9, wherein providing the height control signal such that the front wheel suspension of the vehicle is lowered during the secondary collision with the pedestrian comprises:
determining a lift direction of the detected pedestrian after the primary collision with the pedestrian; and
providing the height control signal based on the determined lift direction of the detected pedestrian after the primary collision with the pedestrian such that a height of the front wheel suspension of the vehicle differs from a height of a rear wheel suspension of the vehicle.

12. The driver assistance apparatus according to claim 1, wherein the at least one processor is configured to provide the height control signal that controls the suspension of the vehicle such that the suspension of the vehicle absorbs a shock of the secondary collision with the pedestrian by:
providing the height control signal that controls the suspension of the vehicle such that a hood of the vehicle lifts up prior to the secondary collision and after the primary collision with the pedestrian.

13. The driver assistance apparatus according to claim 1, wherein the at least one processor is configured to provide the height control signal that controls the suspension of the vehicle such that the suspension of the vehicle absorbs a shock of the secondary collision with the pedestrian by:
determining a lift direction of the detected pedestrian after the primary collision with the pedestrian; and
providing, based on the determined lift direction of the detected pedestrian after the primary collision with the pedestrian, the height control signal to control a lift-up operation of a hood of the vehicle by operation of a first actuator disposed on a left side of the vehicle and a second actuator disposed on a right side of the vehicle such that a degree of operation of the first actuator differs from a degree of operation of the second actuator.

14. The driver assistance apparatus according to claim 1, wherein the at least one processor is further configured to:
   detect, based on the data acquired in the driving direction of the vehicle, a curve in a road ahead of the vehicle; and
   provide, based on detection of the curve in the road ahead of the vehicle, the height control signal to control a left wheel suspension of the vehicle or a right wheel suspension of the vehicle.

15. The driver assistance apparatus according to claim 1, further comprising:
   an interface unit configured to receive, through a sensing unit, travel speed information of the vehicle,
   wherein the at least one processor is further configured to:
      detect a degree of curvature of a curve in a road ahead of the vehicle and a speed of the vehicle entering the curve in the road; and
      provide the height control signal to control a height of a left wheel suspension of the vehicle or a right wheel suspension of the vehicle based on the detected degree of curvature of the curve in the road ahead of the vehicle and the detected speed of the vehicle entering the curve in the road.

16. The driver assistance apparatus according to claim 1, further comprising:
   an interface unit configured to communicate with a power source drive unit that provides driving power to the vehicle,
   wherein the at least one processor is further configured to:
      detect a front collision or a rear-end collision with the detected object; and
      provide a control signal to the power source drive unit to disable driving power to the vehicle.

17. The driver assistance apparatus according to claim 1, wherein the at least one processor is configured to:
   detect, based on the data acquired in the driving direction of the vehicle, road surface condition information for a road ahead of the vehicle; and
   provide the height control signal based on the detected road surface condition information.

18. The driver assistance apparatus according to claim 1, wherein the at least one processor is configured to:
   determine that a trunk of the vehicle has opened; and
   provide, based on the determination that the trunk of the vehicle has opened, the height control signal to lower a rear wheel suspension of the vehicle.

19. A vehicle comprising:
   a driver assistance apparatus comprising:
      an object detection sensor configured to acquire data in a driving direction of the vehicle or around the vehicle; and
      at least one first processor configured to:
         detect an object based on the acquired data;
         determine, based on the acquired data, a portion of the detected object that is expected to be impacted by the vehicle;
         provide, based on the determined portion of the detected object that is expected to be impacted by the vehicle, a height control signal that controls a suspension of the vehicle to adjust a height of at least a portion of the vehicle; and
   a suspension apparatus comprising:
      an interface unit configured to receive the height control signal; and
      at least one second processor configured to control a height of the suspension of the vehicle according to the received height control signal,
   wherein the object detection sensor includes at least one camera,
   wherein the at least one first processor is configured to:
      detect, based on the acquired data, that the object is a pedestrian;
      determine that the detected pedestrian is expected to be impacted by the vehicle in a primary collision and in a secondary collision after the primary collision; and
      provide, based on the determination that that the detected pedestrian is expected to be impacted by the vehicle in the primary collision and in the secondary collision after the primary collision, the height control signal that controls the suspension of the vehicle such that the suspension of the vehicle absorbs a shock of the secondary collision with the pedestrian,
   wherein the at least one first processor is further configured to:
      detect a height to which the pedestrian is lifted in a vehicle front view image from the camera; and
      determine a time to lower the front wheel suspensions based on the lift height of the pedestrian,
   wherein the primary collision is a collision between the pedestrian and a part of the bumper of the vehicle, and
   wherein the secondary collision is a collision between the pedestrian and a hood, windshield, or roof of the vehicle.

20. A method performed by a driver assistance apparatus, the method comprising:
   detecting an object based on data acquired by an object detection sensor including at least one camera, the data acquired in a driving direction of a vehicle or around the vehicle;
   determining, based on the acquired data, a portion of the detected object that is expected to be impacted by the vehicle; and
   providing, based on the determined portion of the detected object that is expected to be impacted by the vehicle, a height control signal that controls a suspension of the vehicle to adjust a height of at least a portion of the vehicle,
   wherein the method further comprises:
      detecting, based on the acquired data, that the object is a pedestrian;
      determining that the detected pedestrian is expected to be impacted by the vehicle in a primary collision and in a secondary collision after the primary collision; and
      providing, based on the determination that that the detected pedestrian is expected to be impacted by the vehicle in the primary collision and in the secondary collision after the primary collision, the height control signal that controls the suspension of the vehicle such that the suspension of the vehicle absorbs a shock of the secondary collision with the pedestrian,
   wherein the method further comprises:
      detecting a height to which the pedestrian is lifted in a vehicle front view image from the camera; and
      determining a time to lower the front wheel suspensions based on the lift height of the pedestrian,
   wherein the primary collision is a collision between the pedestrian and a part of the bumper of the vehicle, and wherein the secondary collision is a collision between the pedestrian and a hood, windshield, or roof of the vehicle.

* * * * *